Oct. 8, 1957  A. D. GUNDERSON  2,808,765
POWERED MASTER ACTUATED TRACER CONTROLLED MILLING MACHINE
Filed May 24, 1955  8 Sheets-Sheet 2

INVENTOR:
Allen D. Gunderson
BY Peck & Peck
ATTORNEYS.

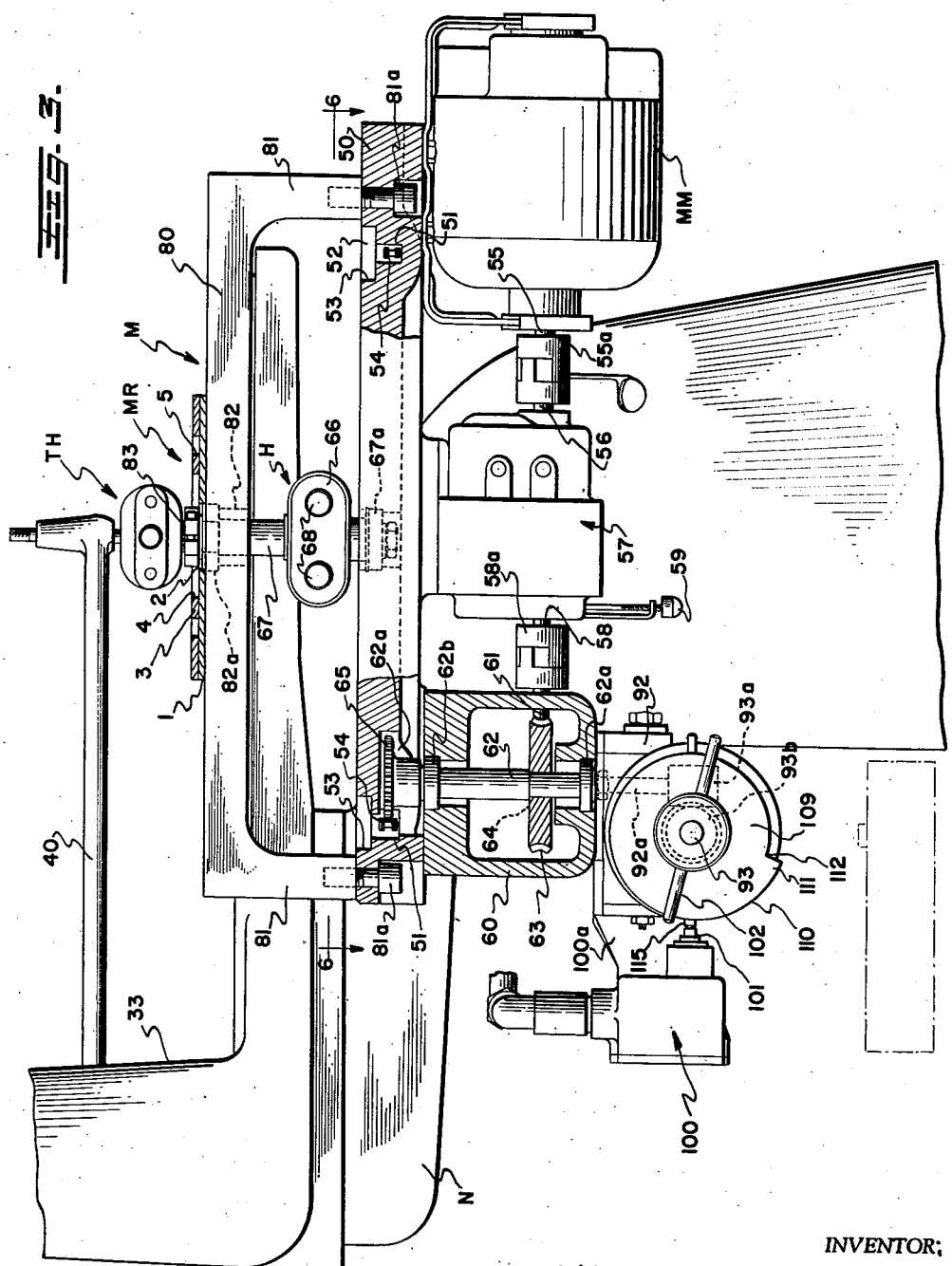

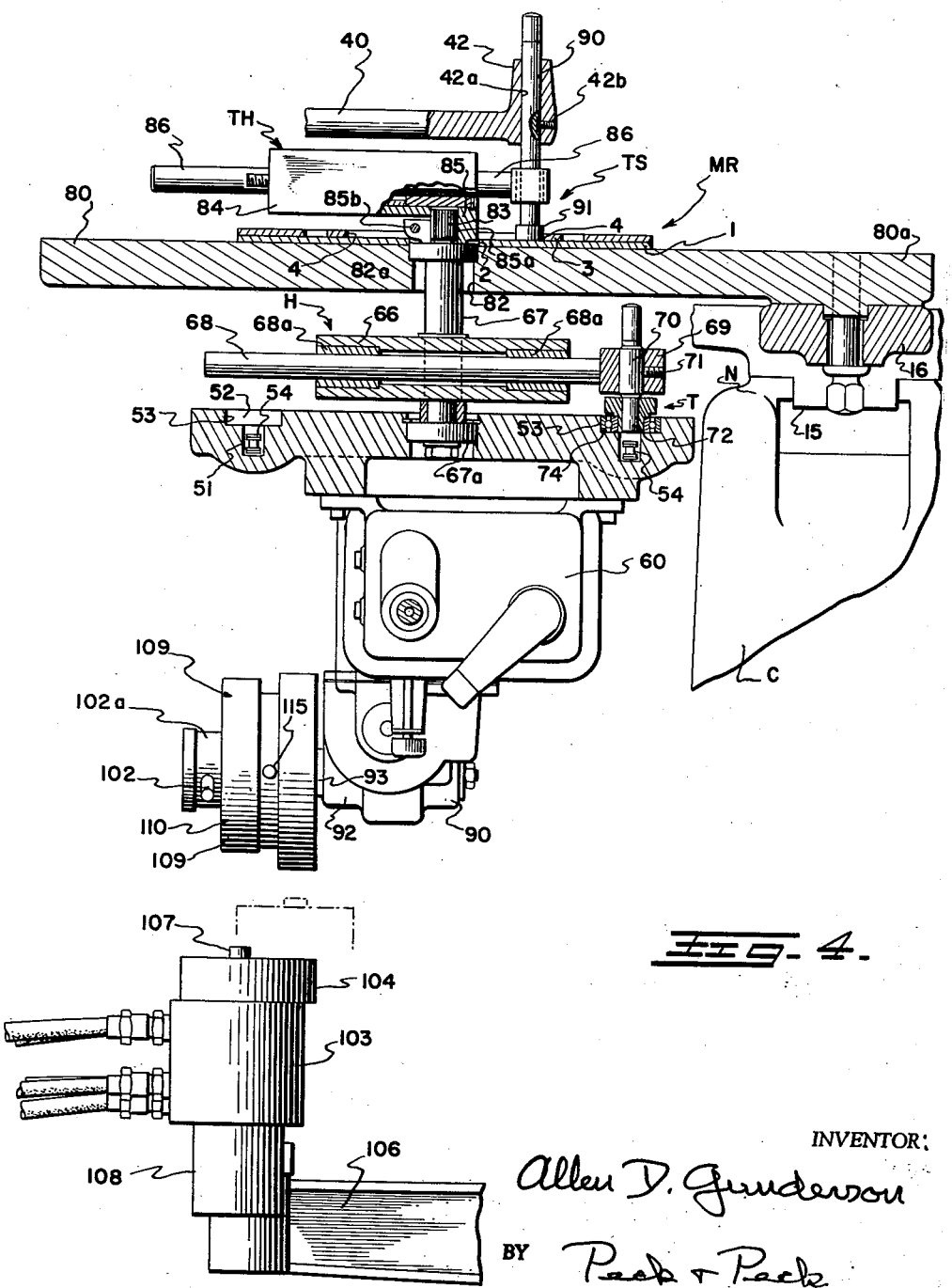

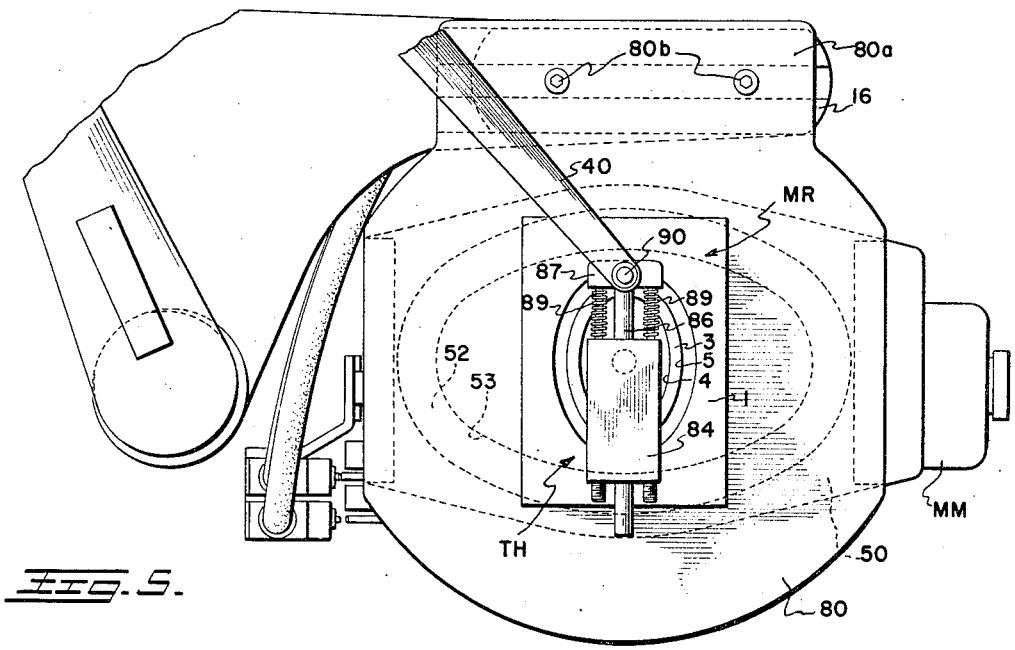
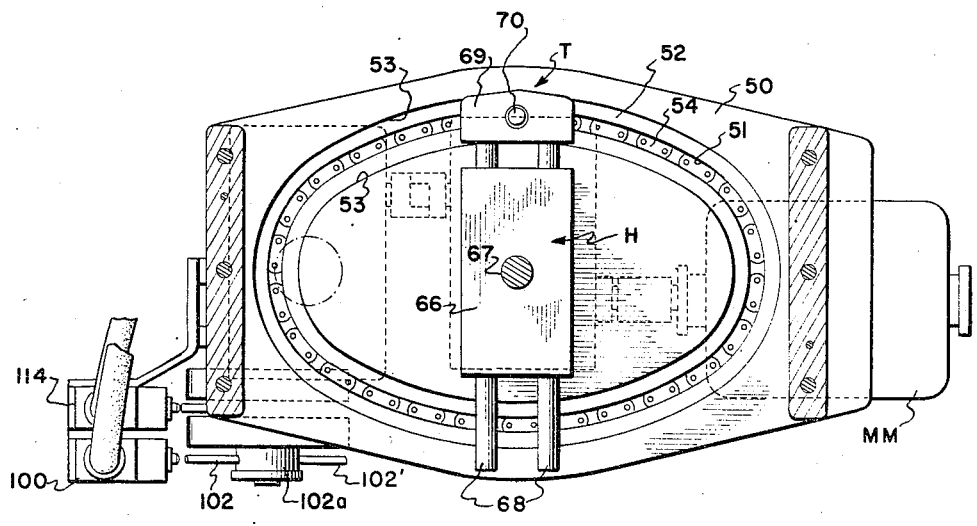

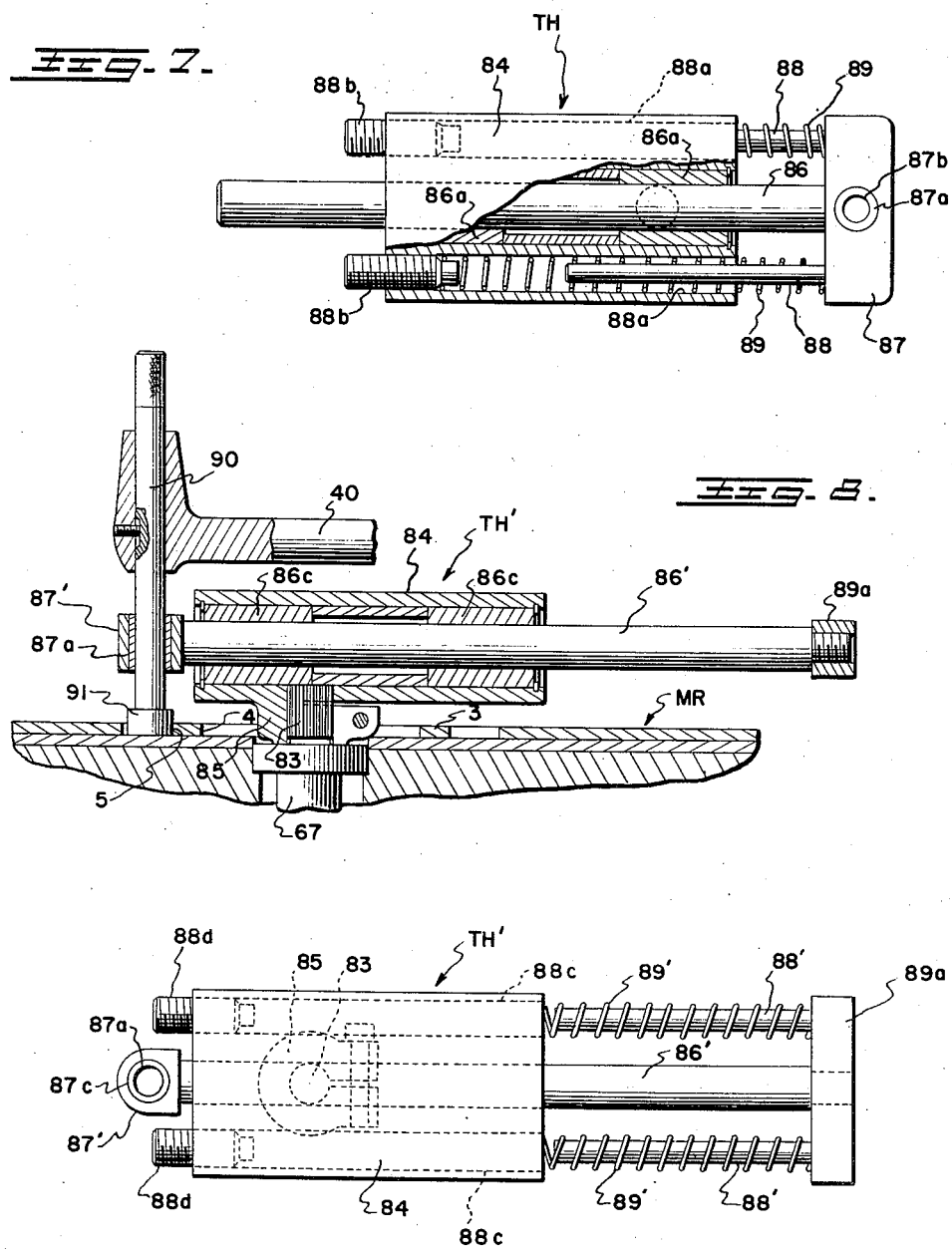

Oct. 8, 1957  A. D. GUNDERSON  2,808,765
POWERED MASTER ACTUATED TRACER CONTROLLED MILLING MACHINE
Filed May 24, 1955  8 Sheets-Sheet 7

INVENTOR:
Allen D. Gunderson
BY Peck & Peck
ATTORNEYS.

United States Patent Office 2,808,765
Patented Oct. 8, 1957

2,808,765

POWERED MASTER ACTUATED TRACER CONTROLLED MILLING MACHINE

Allen D. Gunderson, Racine, Wis., assignor to George Gorton Machine Co., Racine, Wis., a corporation of Wisconsin Application May 24, 1955, Serial No. 510,630

21 Claims. (Cl. 90—13.1)

This invention relates to certain improvements in powered master actuated tracer controlled milling machines, the invention being particularly concerned with a powered master component for but not necessarily limited to such machines of the tracer controlled pentographic types; and the nature and objects of the invention will be readily recognized and understood by those skilled in the arts to which it relates in the light of the following explanation and detailed description of the accompanying drawings illustrating a selected profile milling machine and powered master unit thereof as example embodiments or mechanical and organizational expressions of the invention and the several features thereof from among various other embodiments, expressions, adaptations, designs, constructions and combinations of which the invention is capable within the broad spirit and scope thereof as defined and covered by the claims hereto appended.

The invention is particularly directed to machines of the types in which a material removing tool, such as a milling cutter, grinder or the like, is universally laterally moved over a work piece in material removing engagement therewith by a movement transmitting mechanism, such as a pentograph linkage, that is power actuated by and under the control and dictation of a powered master unit having a master profile surface that is to be formed in precise scaled reproduction thereof as a profile surface on a work piece; and one of the primary objects of my present invention is to increase the efficiency of operation and precision of performance and rate of production of such a machine, as well as to increase the operating range thereof for forming symmetrical and non-symmetrical internal or external profile surfaces on a work piece as precisely scaled reproductions of the master profile surface on the powered master unit of the machine.

A further object is to provide such a machine of the semi-automatic type in which a material removing or profiling cycle thereof is initiated under the manual control of the operator but which cycle when once initiated is thereafter fully automatically performed throughout the tracing and profiling operation on the work piece with the operation then being stopped automatically at the completion of the cycle.

Another object is to provide a powered master unit capable of interchangeably mounting and efficiently operating with and reproducing from different masters with various sizes, shapes or contours for controlling and dictating the powered reproducing operations of a machine organization in which the master unit is combined and forms a component.

A further object is to provide such a powered master unit with which relatively simple forms of profile masters may be readily interchangeably removably mounted in the unit.

A further object is to provide such a powered master unit capable of reproducing on a work piece a profile surface located and positioned thereon at any desired angle through 360°.

A further object is to provide such a powered master unit adapted for the interchangeable mounting thereon of different profile masters having the master profile surface thereof set at any desired angle through 360°.

A further object is to provide such a powered master unit having a power driven reproducing tracer stylus infinitely adjustable through 360° around its tracing path to adjust and set the tracer stylus for efficient tracing operation from a master mounted on the unit with the master profile surface thereof set at any selected angle through 360°.

Another object is to provide such a power driven master unit in which the selected rate of speed of tracing movement of the reproducing tracer stylus and the rate of feed of the tool actuated thereby through a work piece, are maintained constant automatically throughout a cycle of tracing and reproducing from a master profile surface.

A further object is to provide a power driven master unit having a master groove positionally fixed with a power driven tracer stylus guided by such groove and a reproducing tracer stylus driven from the driving stylus for tracing engagement with a master profile surface set at any desired angle through 360° with the reproducing tracer stylus being infinitely angularly adjustable through 360° around its tracing path relative to the tracing path of the driving tracer stylus.

And a further object is to provide a design and construction of such a powered master unit having maximum efficiency of performance with minimum of maintenance required and with precision of operation over long periods of time in quantity production operation and use thereof.

With the foregoing and various other objects, features and results in view which will be readily apparent from the following detailed description and explanation, my invention consists in certain novel features in design and construction and in combinations, arrangements and sub-combinations, all as will be more fully referred to and specified hereinafter.

Referring to the accompanying drawings in which similar reference characters refer to corresponding parts and elements throughout the several figures thereof:

Fig. 3 is a view mainly in side elevation but partly in vertical section of the powered master unit as located and mounted at the upper end of the supporting column structure of the machine of Fig. 1.

Fig. 4 is a view partly in side elevation and partly in vertical section taken generally as on the line 4—4 of Fig. 2.

Fig. 5 is an enlarged view in top plan of the powered master unit of the machine of Fig. 1, showing a master mounted thereon with the reproducing tracer stylus in operative tracing relation therewith.

Fig. 6 is a view in horizontal section through the powered master unit, taken as on the line 6—6 of Fig. 3, showing the master base plate, driving tracer holder and stylus assembly and the powered chain drive therefor in top plan.

Fig. 7 is a detail view, partly in top plan and partly in horizontal section, of the reproducing tracer stylus holder of a type for internal milling.

Fig. 8 is a detail view in vertical section through a modified form of reproducing tracer stylus holder and tracer stylus adapted for external milling, the tracer stylus holder and tracer stylus being shown in mounted, operative position in the powered master unit of the machine of Fig. 1.

Fig. 9 is a view in top plan of the tracer stylus holder of Fig. 8.

Figure 1:
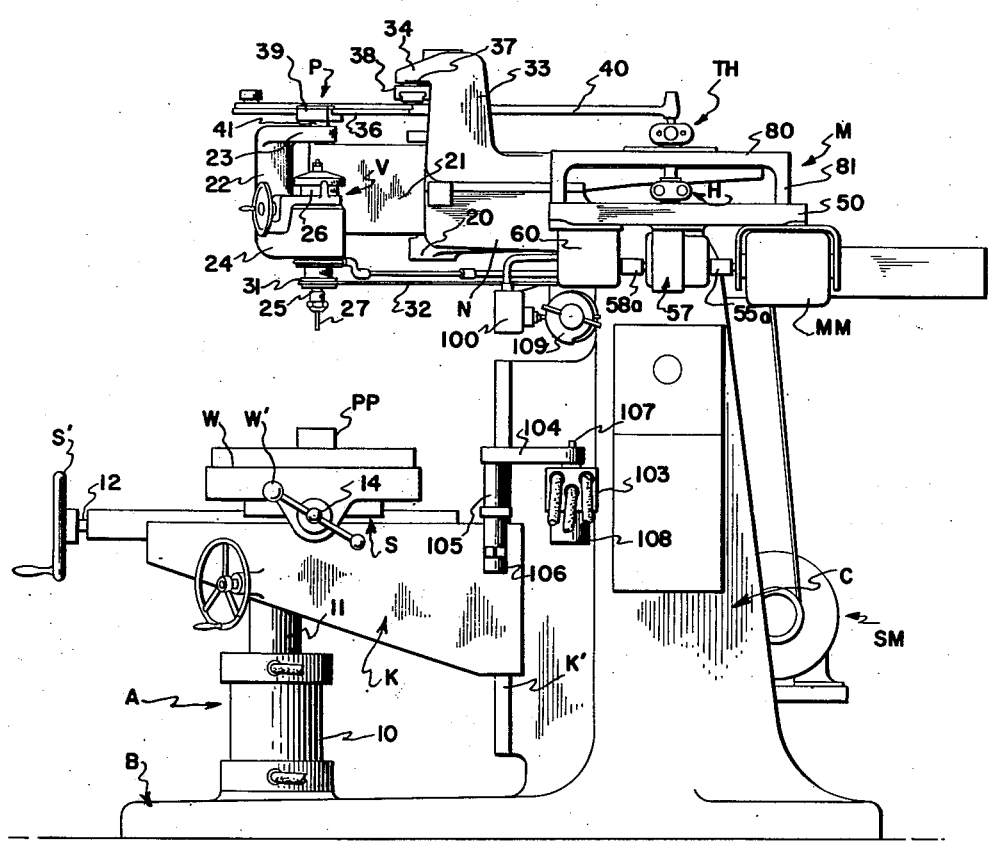
Fig. 1 is a view in side elevation of a machine embodying my invention, taken as from the right-hand side thereof when facing the front of the machine.

A machine organization of the powered master, tracer controlled pantographic type embodying and incorporating my present invention and the various features thereof has been selected and is disclosed herein purely as an example for purposes of description and explanation. The machine of the selected example is of the single spindle type for forming, as by milling, grinding or other material removing operations, endless symmetrical or non-symmetrical profile surfaces on the internal or external surfaces of a work piece as precise reproductions of a master surface on said powered master unit. It so happens that the example machine was designed and is particularly adapted for the profile milling or grinding to final finished form of oval shaped mold cavities in a mold block, as well as for milling on the exterior surface of the mold block around the mold cavities therethrough, oval grooves or recesses surrounding and concentric with the oval mold cavities, respectively. However, while the example machine is particularly adapted for the foregoing types or forms of milling or grinding operations and is shown as set up and mastered therefor, it is not intended to limit or restrict machines or organizations of the invention to such types of operations or forms or characters of work pieces, as the invention is intended for and is adapted to carrying out a wide range and variety of material removing operations, such as milling, grinding and such like operations, to form symmetrical and non-symretical, internal or external profile surfaces of any desired shape or contour on work pieces of various shapes, sizes and materials.

Further, while an adaptation and form of an adjustable, powered master unit capable of maintaining a selected rate of tool feed and of using interchangeable masters, all in accordance with my invention, is disclosed herein in a combination making up the particular example machine hereof, it is to be understood that my invention contemplates and includes adaptations and embodiments of the powered master unit in various other combinations and arrangements of machine organizations generally. The principles and features of a powered master unit of the invention by which such a unit will maintain a constant tool feed rate may be used with different masters and be adjusted for various angular set-ups and relationships in accordance with the conditions presented by any particular master and work piece to be profiled therefrom, are capable of embodiment in powered master units for use over a wide range of machines and operations and in various operative combinations generally.

The example machine happens to be of the column and knee type and includes a base B having a vertical column structure C extending upwardly therefrom. This column structure C at its upper end provides a horizontally and forwardly projecting head or neck N. A knee K is vertically adjustably mounted on and from the base B at the forward side of the column structure C. The knee K is vertically slidably engaged with the column structure C at the forward side of the latter structure by a suitable vertical slide and slideway arrangement and combination K' in the general manner familiar in this art. In this example the knee K is hydraulically operated vertically upwardly and downwardly on the slide arrangement K' and such operation is interlocked into synchronized functioning with the operating cycle of the machine. Thus mounted, the knee K is constrained by such slide arrangement K' to movements in either direction, that is, upwardly or downwardly, along a straight-line path. The knee K is vertically movable upwardly and downwardly by a hydraulic cylinder and piston unit A which includes the cylinder 10 mounted in vertically disposed position extending upwardly from base B at the forward side of column C in position below the knee K and the plunger or piston rod 11 extending vertically upwardly from the upper end of the cylinder 10. The plunger 11 is connected and coupled at its upper end to the knee K. Thus, when the cylinder and piston unit A is hydraulically operated to force the plunger 11 upwardly, the knee K is thereby moved upwardly, while the reverse operation of the cylinder and piston unit A to force the plunger 11 thereof downwardly will thereby move the knee K downwardly. The knee K is supported primarily from the base B by the cylinder and piston unit A in all positions of vertical adjustment thereof.

The knee K slidably mounts on a suitable slide on the upper side thereof a saddle S for cross-movements in or out thereon relative to the column structure C. Any usual or suitable mechanism may be provided for so moving the saddle S on knee K, such as the familiar arrangement of knee mounted feed screw 12 threadedly engaging the usual or any suitable feed nut (not shown). Such cross-feeding mechanism in the present example is of the manual type operable from a suitable hand wheel or crank S' located on the outer end of feed screw 12 at the forward end of the saddle S, as will be clear by reference to Fig. 1.

A worktable W is mounted on the upper side of the saddle S for longitudinal movements thereon in either direction along a straight-line path perpendicular or normal to the straight-line path of cross-movements of the saddle S on the knee K. This worktable W is selectively actuated in either direction on its longitudinal movements on saddle S by any usual or suitable feed mechanism which includes a feed screw 14 suitably mounted and journaled in fixed position on and across saddle S with any usual or suitable feed nut or nuts (not shown) carried by the worktable W and threadedly engaged by such feed screw. Any suitable hand crank or hand wheel W' is mounted on one end of the saddle feed screw 14 for selectively rotating such feed screw in the required direction to feed and displace the worktable W to the right or to the left longitudinally of the machine. Obviously, if desired or found expedient, as will be familiar to the art, both the saddle S and the worktable W may be of the power actuated type.

The neck N at the upper end of the column structure C is formed in the upper side thereof with a suitable groove 15 therein which extends longitudinally thereof and crosswise of the machine. An elongated slider head 16 is adjustably mounted on the upper side of neck N in slidable engagement therewith and constrained in the groove 15 for movements in either direction to any required fixed position of adjustment thereon crosswise of the machine. At the left-hand side of the neck N of column structure C adjacent the outer end of said neck (when facing the example machine), there is provided a pair of vertically spaced horizontally outwardly and forwardly extending arms 20 which have pivotally mounted therebetween for swinging in a horizontal plane about a vertical axis the link 21 of a linkage system for mounting and supporting thereon the cutter spindle assembly unit of the machine. A link 22 is pivotally coupled at one end thereof to the outer free end of the link 21 and extends outwardly therefrom for horizontal swinging thereon about a vertical axis. The link 22 provides at the outer free end thereof the vertically spaced horizontally disposed upper and lower arms 23 and 24 extending inwardly toward the column of the machine in position above the worktable W. A cutter spindle assembly unit V is mounted and supported in vertically disposed position on the lower arm 24 of link 22 with the upper portion of the assembly V located in position between arms 23 and 24 spaced a distance below the upper arm 23. Thus, the links 21 and 22 provide for universal lateral movements of the cutter spindle unit V carried thereby over the worktable W therebelow.

The cutter spindle unit V which is mounted in fixed position on and carried by the link 21 includes the vertically positioned cutter spindle 25 which is journaled in the case or housing 26. This cutter spindle 25 extends downwardly through the case 26 and the lower arm 24 of the link 22 in position for the removable mounting on the lower end thereof any of the well-known manners familiar in the art, of any suitable rotary material removing or cutting tool, such as the milling cutter 27 of the instant example. The cutter spindle unit V in its specific design and construction forms no specific part of my present invention, except insofar as it provides a component in the combination of and for the functioning as required by the example machine organization and combination of the invention. Hence, it is not considered necessary to make any detailed disclosure of such a cutter spindle assembly or unit herein. Such cutter spindle assembly may be taken to be of any one of the types suitable for the present example, such as exemplified in such U. S. patents as Nos. 1,562,237, 1,956,505, 1,959,269, 2,000,838, 2,557,876, 2,645,161 and 2,658,423.

A suitable cutter spindle driving motor, such as the motor identified generally by the reference character SM and shown in Fig. 1, is mounted and supported from the column structure on a platform (not shown) vertically rockable about a horizontal axis with a driving belt system 32 extending therefrom in driven connection therewith for driving or rotating the cutter spindle 25. This type of powered cutter spindle drive is shown in such U. S. patents as Nos. 1,790,581 and 1,925,036, so that it is not considered necessary to make a detailed disclosure thereof herein as reference may be made to the foregoing patents for an understanding of such type of cutter spindle drive and its mounting and functioning in a machine of the tracer controlled pantograph type, such as the example machine of the invention hereof. The cutter spindle 25 depends downwardly below the lower arm 24 of the link 22 and has mounted thereon a driven pulley 31 for powered rotation of such cutter spindle from the motor SM. The driving belt system 32 driven from and by the motor SM is connected in driving relation with the driven pulley 31 on the cutter spindle 25 so that such spindle is power driven from the motor. Such a motor driven belt transmission, as will be understood by reference to the above recited Patents 1,790,581 and 1,925,036, includes provision for maintaining driving connection between the belt system 32 and the cutter spindle driven pulley 31 in all positions of the cutter spindle as it is moved universally laterally over the worktable.

The tracer-controlled pantograph linkage

In the example machine a pantograph linkage identified generally by the reference character P is provided for transmitting universal lateral movements to the cutter spindle unit V and its cutter spindle 25 as scaled reproductions of the movements of a tracer stylus in following a master pattern surface. In this instance the pantograph linkage P is mounted and supported in horizontally disposed position from the slider head 16 mounted on the neck N of the column structure C. The slider head 16 is provided with a vertically disposed post 33 which is supported in laterally offset position, being in this instance located at the right-hand side of the slider head when facing the example machine. The post 33 is provided with a horizontally disposed hanger arm 34 which extends inwardly therefrom to position at the forward end of the slider head 16 in a location generally above the link 22 and the cutter spindle unit V mounted and carried thereby. The pantograph linkage P is of the parallelogram type and includes the parallel upper bars 35 pivotally coupled at their opposite ends to the adjacent ends of the parallel lower bars 36. The pantograph linkage P is pivotally hung and supported in horizontally disposed position on the underside of the hanger arm 34 by the pivot pin or stud 37 which pivotally connects with the usual slider block 38 on the adjacent upper arm 35 of the pantograph linkage.

Thus mounted, the pantograph linkage P is swingable in a horizontal plane about the pivot pin or stud 37. One of the lower bars 36 is extended outwardly across and above the slider head 16 to provide the outwardly extending tracer arm 40. The pantograph linkage P has a slider block 39 slidably mounted on that lower bar 36 of the pantograph linkage which is parallel with that opposite lower arm 36 which provides and from which the tracer arm 40 extends. The slider block 39 is pivotally coupled by a pivot pin or stud 41 with the upper arm 23 of the cutter spindle unit carrying link 22 which is positioned directly therebelow. The pivot pin 41 of the slider block 39 is positioned in axial alignment with the cutter spindle 25 of the cutter spindle unit V mounted therebelow. Thus, universal lateral movements in its horizontal plane of the pantograph linkage P under the control of the tracer arm 40 will correspondingly universally laterally swing the link 22 and the cutter spindle 25 of the cutter spindle unit V carried thereby universally laterally over a work piece mounted on the worktable W in position therebelow. The cutter spindle 25 is, of course, adapted to be continuously driven by the motor SM as the cutter spindle unit V is universally laterally swung by the operation of the pantograph linkage P.

The powered master unit

According to my present invention I have provided a powered master unit which, as generally referred to hereinbefore, permits of the use of a relatively wide range of different readily interchangeable masters; which provides for the maintenance automatically of a constant rate of speed of tracing by the master controlled tracer stylus and consequently a constant rate of feed of the material removing tool relative to the work piece by the pantograph linkage which is actuated by the tracer stylus; which provides for the mounting and efficient reproduction from masters set at any angular position through 360°; and which provides for angular adjustment of the reproducing tracer stylus to any angular setting through 360° around and relative to the master profile surface being reproduced to thereby adjust the reproducing tracer stylus to the particular angular setting of the master profile surface of the master. In carrying out such features of the invention a powered master unit is characterized by a power driven driving tracer stylus which is controlled by a profile surface formed as at least an approximate scaled enlargement of the profile surface to be reproduced, and a reproducing tracer stylus which is driven from the driving tracer stylus and which is in tracing engagement with the master profile surface of which a precise scaled reproduction is to be formed on a work piece. The powered master unit M of the example machine organization is an adaptation of the invention and of the principles thereof in a form for incorporation and combination in the organization of the example machine for the purposes and functioning of that particular machine, and hence is not intended as a restriction or limitation of the invention only to expressions and adaptations in such specific form to meet the particular conditions of and the work to be performed by the example machine.

In the form and adaptation thereof as here shown, the powered master unit component M comprises a master base plate 50 which is supported in fixed horizontal position at the right-hand side of the neck N when facing the machine in a location immediately to the rear of the post 33 and the hanger arm 34 of the supporting structure for the pantograph linkage P. This master base plate 50 in this example is attached to and supported in position beneath a master mounting table 80. The master mounting table 80 is attached to and supported from the slider head 16 on the neck N, as will be referred to hereinafter. As the example machine is set up for profile milling symmetrical, oval or elliptical shaped surfaces on a work piece, the base plate 50 is provided with an oval or elliptical groove therein centrally located thereon and forming a chainway 51 in the base plate. This chainway 51 preferably closely approximates in shape the oval or elliptical profile surface which is to be reproduced on a work piece as an approximate scaled enlargement of such profile surface. However, the chainway 51 is not required to be a precise scaled reproduction of such profile surface. This chainway 51 opens at its upper side into and forms an endless oval or elliptical groove or recess 52 therein of greater width than the chainway 51 and generally concentric with such chainway to thereby provide such groove 52 with the opposite side, straight-wall surfaces 53 therearound defining and forming master surfaces to guide and be followed by a tracer stylus in tracing engagement therewith through an endless oval or elliptical path of movement which is an approximate, but not necessarily a precise, scaled enlargement of the shape or contour of the surfaces to be profile milled, ground, or otherwise formed by material removal on the work piece.

The oval or elliptical chainway 51 and the master groove 52 concentric therewith and into which the chainway opens are in this example located and positioned on the master base plate 50 with the long axes thereof parallel with the straight-line path of cross movements of the saddle S on the knee K, that is to say, with the long axes disposed crosswise or extending in a direction from front to rear of the machine. Such relative positioning of the master groove 52 on the master base plate 50 is primarily for the purpose of obtaining a larger working area in a required position under the conditions presented by the mounting and location of the pantograph linkage P of the example machine.

An endless, roller type chain 54 is slidably mounted and confined in and around the chainway 51 for power drive thereof through the endless oval or elliptical path provided by the chainway. The chain 54 is driven by a powered drive transmission including a master motor MM which is mounted and attached in position at the underside of the master base plate 50 with its driving shaft 55 horizontally disposed and in this instance approximately parallel with the straight-line path of cross-movements of the saddle S on the knee K.

The forward end of the driving shaft 55 of the motor MM is connected by a suitable coupling 55a with the input shaft 56 of a variable speed unit 57 of the infinitely variable type. This infinitely variable speed unit 57 may be of the gear, belt and pulley, or any of the other suitable types well known and familiar in the art so that no detailed disclosure thereof is necessary herein. The variable speed unit 57 has a take-off shaft 58 extending horizontally forwardly from the forward side thereof with the unit being capable of infinitely varying the rate of speed of rotation of the take-off shaft 58 which is driven through the variable speed mechanism of the unit from the power input shaft 56. A manually operable member 59 is provided for operating and setting the unit 57 to deliver a desired rate of rotation of the take-off shaft 58 within the range of infinite adjustment thereof.

A gear box 60 is mounted in position adjacent the forward end of the master base plate 50 in position depending from the underside thereof spaced forwardly from the variable speed unit 57. This transmission gear box 60 includes a power input shaft 61 which extends rearwardly therefrom in horizontally disposed position in substantial axial alignment with the take-off shaft 58 of the unit 57. Shaft 61 is coupled in driven connection with shaft 58 by a suitable coupling 58a. The gear box 60 mounts and journals therein the vertical, chain drive shaft 62 which is in driven relation with the input shaft 61 by means of a suitable worm wheel 63 in driven engagement with a worm 64 on said shaft 61. The drive shaft 62 extends vertically upwardly through the gear box 60. This shaft 62 is journaled in the lower wall of that box in a suitable bearing assembly 62a and in the upper wall of the box in a suitable bearing assembly 62b. The gear box 60 is located in position below the forward end of the master base plate 50 and the master groove 52 therein. The drive shaft 62 of gear box 60 is positioned with its axis spaced inwardly a distance from the forward end of the master groove and intersecting the longitudinal axis thereof. The drive shaft 62 extends vertically upwardly through the master base plate 50 into a recess or chamber 62a formed in the base plate and opening at its outer side into the adjacent side of the chainway 51. A chain driving sprocket 65 is mounted on the upper end of the drive shaft 62 within the recess 62a. This sprocket 65 is of a diameter to extend through the opening from the recess 62a through the adjacent side wall of the chainway 51 into driving engagement with the endless chain 54 so that rotation of sprocket 65 by the drive shaft 62 will move the endless chain 54 through and around the endless elliptical or oval chainway 51 in which it is mounted and confined.

*The driving tracer stylus*

In the form of powered master unit M of the invention for the example machine, the endless chain 54 is adapted to be coupled with and operate a driving tracer stylus, identified generally by the reference character T, in and around the endless oval master groove 52 in tracing engagement with and guided by the tracing surfaces 53 provided by that groove. This driving tracer stylus T is mounted on and carried by a rotatable tracer stylus holder identified generally by reference character H. The tracer stylus holder H in this instance includes a case 66 which is mounted on a freely rotatable shaft 67 journaled at its lower end in a bearing assembly 67a mounted in the master base plate 50. The shaft 67 is mounted in vertically disposed position extending upwardly from the master base plate 50 and is located with its axis concentric with, that is at the center of, the oval or elliptical master groove 52. The casing 66 of the tracer stylus holder H is fixed on shaft 67 spaced above the master base plate 50 in horizontally disposed position extending radially of the shaft and with the shaft extending centrally therethrough. Spaced parallel rods 68 are reciprocally mounted in and extend longitudinally through the case 66 at opposite sides of the shaft 67 for free reciprocation in either direction along straight-line horizontal paths longitudinally of the case and radially relative to the shaft 67. Spaced linear bearings 68a of any suitable antifriction type are provided in the case 66 for slidably reciprocally receiving each rod 68. These rods 68 project at their opposite ends outwardly beyond the opposite ends of the case 66 and are joined and connected at one end thereof by a crosshead 69. The rods 68 and crosshead 69 are freely reciprocal as an unbiased unit in the case 66 radially of the shaft 67 and of the master groove 52.

A tracer pin 70 is mounted in the crosshead 69 intermediate the rods 68 in vertically disposed position. This tracer pin 70 is mounted in a vertical bore formed through the crosshead 69 and in this specific example is releasably secured in any vertical position of adjustment therein by a set screw 71 threaded into the crosshead from the outer side thereof. Tracer pin 70 projects upwardly a distance above and extends downwardly a distance below crosshead 69 with the portion of the pin above the crosshead being suitably knurled for ease of manipulation for removal and replacement and for adjustment thereof in and relative to the crosshead. The length of the tracer pin 70 which extends downwardly below the crosshead 69 is of reduced external diameter to provide a shank on which there is mounted an adapter 73. The shank 72 of tracer pin 70 extends downwardly through the master groove 52 and terminates at its lower end at the upper, open side of the endless chainway 51. The adapter 73 provides a reduced diameter circular portion at the lower end thereof on which there is mounted an annular roller bearing assembly or tracer roller 74 which is in rolling bearing and tracing engagement with a master guiding surface 53 of the master groove 52. A link 75 connects the adapter 73 and the tracer stylus assembly of which it forms a part with the endless chain 54 in the chainway 51, this link being vertically disposed and preferably providing or being connected to one of the pivot pins coupling a pair of adjacent links of the chain 54. Thus the driving tracer stylus T is movable around the master groove 52 in tracing engagement with and guided and constrained to the oval path defined by a master surface 53 of that groove, by movement of the power driven endless chain 54 through and around the oval chainway 51, such chainway being substantially a counterpart of and concentric with the master groove 52.

As the radial distances between the drive shaft 67 and the oval master groove 52 vary around the master groove, it follows that as the driving tracer stylus T is moved around such groove, the rods 68 and crosshead 69 which mount and carry the tracer stylus as a unit therewith will be freely reciprocated thereby in the holder H, thus permitting the tracer stylus to move radially toward and from the shaft 67 and to freely follow the oval path defined by the master groove. The shaft 67 on which the tracer stylus holder H is mounted is driven or rotated solely by and from the power driven chain 54 through the tracer stylus T and the radially reciprocal rods 68 so that the input point of the forces rotating the shaft 67 is the tracer stylus T, the radial distance of which form the shaft 67 varies as the tracer stylus moves and is guided by and around the master groove.

*The reproducing tracer stylus*

The cutter spindle unit V mounted on the horizontally swingable, jointed linkage 21—22 is universally laterally moved with its cutter spindle 25 over the work piece in precise scaled reproduction of the master profile surface of a pattern or master by the pantograph linkage P which is operatively coupled with a reproducing tracer stylus TS. Thus the tracing movements of the reproducing tracer stylus TS are transmitted to the pantograph linkage P and then translated by that linkage as movements of the cutter spindle unit V in precise scaled reproduction of the movements of the reproducing tracer stylus. In carrying out this feature of the invention in the example machine, I provide a master mounting table 80 which I locate in a fixed position at the right-hand side of the slider head 16 when facing the example machine. The master mounting table 80 is in this instance provided with an attaching wing or extension 80a which extends horizontally from the inner side edge thereof and which is removably attached in fixed rigid position at the upper side of the slider head 16 by any suitable attaching bolts or the like 80b. This master mounting table 80 is thus located in a horizontal position with its longitudinal axis disposed crosswise of the machine. At the opposite front and rear ends thereof the master mounting table 80 is provided with the depending vertically disposed end walls 81 to the underside edges of which the master base plate 50 is attached by suitable bolts 81a. The master base plate 50 so mounted extends across and between the end walls 81 of table 80 in horizontal position generally parallel with the master mounting table 80 spaced thereabove and extending thereacross. The master mounting table 80 provides on the upper side thereof a horizontal seating surface for the removable mounting thereon of a suitable master, such as the master of this example identified generally by the reference character MR and shown particularly in Figs. 4 and 5.

The shaft 67 which is rotated by and from the driving tracer stylus T as the latter is power driven through and around the master groove 52 by the chain 54, extends vertically upwardly through a central opening or bore 82 in the table 80 and is journaled at its upper end in a suitable bearing assembly 82a mounted in such table. The shaft 67 terminates in a reduced diameter, serrated upper end portion or stub shaft 83 which extends a distance upwardly above the upper surface of the table 80. This serrated upper end stub shaft 83 of shaft 67 is adapted to mount thereon for angular adjustment therearound the tracer stylus holder unit TH for the reproducing tracer stylus unit TS.

The tracer stylus holder TH in the example machine is of the type for so-called internal milling, that is, for reproducing from the master the desired profile on an internal surface of a work piece as opposed to an external surface thereof. However, in accordance with my invention the tracer stylus holder TH is removably mounted on the drive shaft 67 and is interchangeable as a unit with a generally similar tracer stylus holder arranged for so-called external milling, that is, reproducing from the master profile surface the desired profile on an external surface of a work piece. I have shown in Fig. 8 of the drawings a tracer stylus holder TH' of a type for reproducing the profile of a master on a so-called external surface of a work piece. A tracer stylus holder of the type of the holder TH' is also preferably used for forming grooves and such like cuts in a work piece as precise reproductions from a master, all as will be more fully described and explained hereinafter.

The tracer stylus holder TH includes a case 84 from the underside of which adjacent what may be aptly termed the forward end thereof, there depends or projects radially downwardly therefrom a mounting hub 85 having an axial bore 85a therethrough. This hub 85 is of the split ring, clamp type for contraction to clamping position and for expansion to unclamped position by means of the threaded actuating screw 85b. The bore 85a of hub member 85 is of an internal diameter to receive therein the serrated upper end stub shaft 83 of the driving shaft 67 for clamping thereon into position rigidly attached thereto with the case 84 of the tracer stylus holder TH being located thereby in horizontally disposed position thereabove extending radially outwardly from and across the stub shaft 83 of the shaft 67.

A driver rod 86 is reciprocally mounted in and extending centrally through the case 84 of the tracer stylus holder TH in horizontally disposed position with its opposite ends extending outwardly beyond the opposite ends, respectively, of the case. The driver rod 86 is freely slidably mounted in the spaced linear bearing assemblies 86a mounted in the case 84 adjacent the opposite ends thereof. The forward end of the driver rod 86 is provided with a crosshead 87 having a vertical bore 87a extending therethrough and mounting therein a suitable bushing 87b adapted to receive therethrough and mount therein a tracer spindle for operative connection with the outer free end of the tracer arm 40 of the pantograph linkage P.

The tracer stylus holder TH is of the type for profiling on an internal surface of a work piece so that the driver rod 86 is spring loaded and continuously biased in a direction outwardly from the forward end of the case 84, that is, the head 87 of driver rod 86 is continuously biased outwardly away from the adjacent end of the case 84. The head 87 of tracer stylus holder TH is, in this instance, in the form of a crosshead extending across the outer forward end of the driver rod 86 with spaced, parallel guide rods 88 connected at their forward ends to the inner side of head 87 at opposite sides of the bore 87a through the head. These rods 88 extend horizontally inwardly into parallel bores 88a formed in the case 84 with the opposite ends of these bores 88a being internally tapped and closed by the externally threaded plugs 88b threaded a distance thereinto. Coiled expansion springs 89 are mounted and confined in the bores 88a of case 84 between the inner ends of the plugs 88b and the inner side of the head 87 with the guide rods 88 extending through and surrounded by the springs, as will be clear by reference to Fig. 7 of the drawings. Thus the driver rod 86 with the crosshead 87 is continuously biased in a direction outwardly from the forward end of the case 84.

A tracer spindle 90 is mounted in vertically disposed position in and extending through the bushing 87b in the bore 87a through the crosshead 87 on the forward end of the driver rod 86. This tracer spindle 90 extends downwardly below the cross rod 87 and mounts and journals on the lower end thereof the tracer roller 91 of the tracer stylus TS for free rotation on and about the axis of the spindle. This tracer roller 91 is adapted to be continuously yieldingly biased outwardly by the driver rod 86 and crosshead 87 into rolling tracing engagement with and around a master profile surface of a master removably mounted on the upper side of the master mounting table 80. The tracer spindle 90 extends upwardly above the crosshead 87 and is connected with and positively coupled to the free end of the tracer arm 40 of the pantograph linkage P. Such positive connection is made by providing a vertically disposed sleeve 42 on the end of the tracer arm 40 with the tracer spindle 90 extending upwardly through a vertical bore 42a formed in the sleeve. Any suitable means may be provided for releasably locking the tracer spindle 90 in a desired position in and extending upwardly through the bore 42a of sleeve 42, such as the set screw 42b threaded through a side wall of sleeve 42 into locking engagement with the tracer spindle 90. The upper end of the tracer spindle 90 above the sleeve 42 of tracer arm 40 may be suitably knurled to provide a portion for finger-grasping for manually adjusting or positioning the tracer stylus unit TS and the pantograph linkage P to which it is connected through tracer arm 40.

In the example machine, masters such as the master MR illustrated herein, of the plate type are employed for removable and interchangeable mounting in horizontal position at any angular setting through 360° on the upper side surface of the master mounting table 80. A master, such as the master MR hereof, may include a base plate 1 having a central opening 2 therethrough. On the upper side of this base plate in the example master illustrated herein, there is formed or provided a ring-like, annular master profile forming member 3 which projects upwardly therefrom concentric with the opening 2 and which provides therearound at the inner vertical side thereof the endless and in this instance oval or elliptical master profile surface 4. The master profile surface 4 is an exact and precise scaled enlargement of the oval or elliptical shaped surface which is to be profile milled or otherwise formed on a work piece. With a master of the type of the master MR hereof, the outer peripheral surface surrounding the master member 3, may be formed to provide an endless oval or other shaped master profile surface 5 therearound as a precise scaled enlargement of a profile surface to be milled, or otherwise formed ground on a work piece. This outer profile surface 5 is preferably used as the master profile surface from which to reproduce on an external surface of a work piece by utilizing the tracer stylus holder for such type of work, such, for example, as the tracer stylus holder TH' to be hereinafter described.

The master MR is mounted and secured in the required position and angular setting on the table 80 by any of the means well known in the art for this purpose. In mounting the master MR the tracer stylus holder unit TH is unclamped from the upper end stub shaft 83 of the shaft 67 and the tracer spindle 70 is released by the set screw 42b. The tracer roller 91 of the tracer stylus TS is then removed from the tracer spindle 90 and this spindle may then be withdrawn upwardly through sleeve 42 of tracer arm 40 to a position raised and disconnected from the crosshead 87a of the tracer stylus holder TH. The master MR is then mounted in position on the table 80 with the central opening 2 thereof above and in axial alignment with the bore 82 in table 80 so that the upper end 83 of the shaft 67 extends upwardly through the opening 2 in position for mounting thereon of a tracer stylus holder TH. In this instance, when the machine is designed and set up for profile milling oval or elliptical or similarly shaped surfaces on a work piece, the master MR, following the principles and the teachings of my invention, is positioned on the table 80 with the longitudinal or long axis of the master member 3 and the oval master profile surfaces 4 and 5 thereof disposed at an angle to the longitudinal or long axis of the master groove 52 precisely equal to the angle of the oval surface to be reproduced on a work piece to the long axis of the master groove 52, that is to say, to the cross axis of the work table W. This relative mounting and positioning of the master MR in the set-up as shown on the example machine has the long axes of the profile surfaces 4 and 5 thereof set at an angle of 180° to the long or longitudinal axis of the master groove 52 of the master plate 50 for reproducing on the work piece an oval profile surface having its long axis at 180° to the cross axis of the worktable W, as will be clear by reference to Fig. 5.

Figure 10:
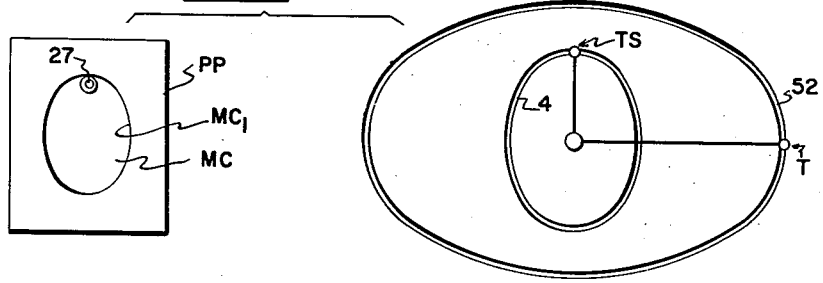
Figs. 10, 11 and 12 are purely schematic views showing different angular settings of masters and of the surfaces reproduced therefrom on work pieces.

After the master MR is mounted and secured in its proper position of angular adjustment on the table 80 relative to the master groove 52, the tracer stylus holder TH is then mounted and clamped on the upper end 83 of the shaft 67 in a position of angular adjustment around the axis thereof to precisely correspond to the angular setting of the master profile surfaces 4 and 5 of the master MR so that the reproducing tracer stylus TS will be positioned in tracing engagement with the master profile surface 4 at a location thereon corresponding to the location of the driving tracer stylus T in the master groove 52. Hence, as shown in Fig. 10, with the driving tracer stylus T in position at the center of one end of the oval master groove 52, the reproducing tracer stylus TS will be at precisely the same center location at one end of the oval master profile surface 4, and as the tracer stylus T and the tracer stylus TS move in tracing operations in the same direction around the master groove 52 and the master profile surface 4, they will throughout the complete tracing cycle be at the same corresponding locations relative to the master groove 52 and the master profile surface 4.

It is to be noted that in the example shown the master profile surfaces 4 and 5 provided by the master MR are of substantially smaller length and width than the length and width of the master groove 52 of the driving tracer stylus T so that smaller tracing paths are provided for the reproducing tracer stylus TS than for the driving tracer stylus T. Such dimensional relationship is, however, not in any sense a limitation on the invention, as master profile surfaces of various dimensions and sizes, greater or smaller than that disclosed for the master MR in the specific example hereof may be utilized. One of the important features and advantages of the invention resides in making it possible to readily efficiently interchangeably use in a single powered master unit a relatively wide range of masters having various sizes and shapes of master profile surfaces for reproduction therefrom of profile surfaces located and positioned on a work piece at any selected angle through 360°.

After the mounting of the master MR on the table 80 and the adjustment of the tracer stylus holder TH on the upper end or stub shaft 83 of the shaft 67, the tracer arm 40 of the pantograph linkage P is then moved to position with the tracer spindle 90 aligned with the bushing 87b in the crosshead 87 and this tracing spindle is then forced downwardly through the bushing in the crosshead to a position therebelow at which the tracer roller 91 of the reproducing tracer stylus TS may be mounted thereon. With the tracer roller 91 mounted on the tracer spindle 90, the tracer spindle is then further lowered to position the lower surface of roller 91 at the upper surface of the base plate 1 of the master MR. The driver rod 86 of the tracer stylus holder TH is retracted against biasing springs 89 when the tracer spindle 90 is lowered to its final operative position at the master MR so that the tracer spindle and the roller 91 thereon are spaced a distance inwardly from and clear of the inner surrounding master profile surface 4. When the tracer spindle 90 and its tracer roller 91 are in their proper lowered position, they are then released to the action of the biasing springs 89 which act on the driver rod 86 and force the driver rod outwardly to thus continuously yieldingly bias the tracer roller 91 into rolling tracing engagement with and against the inner master profile surface 4 of the master MR. Thus positioned and conditioned, the reproducing tracer stylus TS may then be power driven from and by the shaft 67 with the tracer roller 91 being continuously maintained in yielding tracing engagement with the endless oval master profile surface 4 as the tracer stylus TS is driven therearound.

*Maintaining a constant rate of speed of tracing and a constant rate of tool feed in a work piece*

The endless driving chain 54 of the powered master unit M is driven from the motor MM with any given master and angular estting thereof on the master table 80 at a constant rate of speed which is, of course, selectively set at the desired rate by the variable speed unit 57. In order to attain and maintain the highest degree of efficiency of operation and rate of production of profiling and with a minimum of spoilage and of cutting tool breakage, it is essential that the rate of speed of feed of the cutting tool laterally through a work piece be maintained constant during the profiling or reproducing cycle. By my present invention I have attained this constancy at the selected rate of speed of feed by providing for the ready and accurate infinite angular adjustment of the reproducing tracer stylus TS through 360° around the axis of the driving shaft 67 relative to the driving stylus T, so that for any setting there is always maintained a position of the reproducing tracer stylus TS relative to its controlling and dictating master profile surface 4 that precisely corresponds to the position of the driving tracer stylus T relative to its guiding master groove 52.

The example machine is shown in Figs. 1 and 10 as set up for milling on the work piece PP secured on the worktable W, an oval mold cavity MC having the oval profile surface MC1 as a precise reduced scale reproduction of the oval master profile surface 4 of the master MR which is removably attached in mounted position on the master mounting table 80, as referred to hereinbefore. This oval cavity MC is to be reproduced in the work piece PP with the longitudinal or long axis of the cavity and of the oval profile surface MC1 thereof parallel with the longitudinal axis of the worktable W and at right angles to the cross axis of the worktable and to the longitudinal or long axis of the master groove 52 for the driving tracer T. Hence, in accordance with my invention the master MR is mounted on the table 80 with the long or longitudinal axis of the oval profile surface 4 thereof parallel with the longitudinal axis of the worktable W and at right angles or perpendicular to the cross axis of the worktable and to the long or longitudinal axis of the master groove 52, as will be clear by reference to Fig. 10.

With the master MR so angularly set, then the tracer stylus holder TH is angularly adjusted on and around the upper end stub shaft 83 of the driving shaft 67 to a position located precisely 90° from the tracer stylus holder H, that is to say, with the axis of the tracer spindle 90 and tracer roller 91 spaced precisely 90° around the master profile surface 4 from the axis of the tracer pin 70 and tracer roller 53 of the driving tracer stylus T, as will be clear by reference to Fig. 10. When thus angularly adjusted and set, the reproducing tracer stylus TS throughout the tracing cycle thereof will always be located at positions around the oval master profile surface 4 which precisely corresponds to the positions of the driving tracer stylus T in and around the oval master groove 52 as the driving tracer stylus T and the reproducing tracer stylus TS are simultaneously driven by and from the chain 54 and the driving shaft 67. If, therefore, the driving chain 54 is driven at a constant rate of speed, it follows that with the master set-up on the machine of Fig. 1 the reproducing tracer stylus TS will be moved at a constant rate of speed through its tracing cycle around the oval master profile surface 4 and will effect the profile reproducing movements of the cutter spindle and the milling cutter 27 thereon at a constant rate of feed laterally in the work piece through the medium of the movement transmitting pantograph linkage P.

But my invention a powered master unit M may interchangeably mount and efficiently operate from a variety of masters as to size and profile shape and from various angular settings of a master on the master mounting table of the unit. As disclosed in the example hereof, a master may be mounted and positioned on the master mounting table 80 at infinite angles of setting through 360° around the axis of the tracer stylus driving shaft 67 in order to reproduce on a work piece a profile surface positioned thereon at any angle through 360°. As an example of the range of profiling operations possible with a powered master unit of the invention, there is shown more or less diagrammatically in Fig. 11 a view taken as in top plan of the master groove 52 of the master unit M with the driving tracer T thereof and of the worktable W with a work piece PP' in which an oval profile surface MC2 is to be formed at an angle of approximately 45° to the cross axis of the worktable W. In such a profile milling operation, assuming the oval master MR is to be used, such master is mounted and positioned on the master mounting table 80 of the unit M with its long or longitudinal axis precisely positioned at an angle of 45° relative to the longitudinal or long axis of the master groove 52. Then, in accordance with my invention, the tracer stylus holder TH for the reproducing tracer stylus TS is manually adjusted by rotating it on the serrated upper end stub shaft 83 of shaft 67 to a position in which the axis of the driver rod 86 is located an angular distance of precisely 45° from the axis of the driver rod 68 of the tracer stylus holder T for the driving tracer stylus T, so that the axis of the tracer spindle 90 of the tracer stylus roller 91 is positioned at the master profile surface 4, at an angular distance of 45° from the axis of the tracer pin 70 of the tracer roller 53 of the driving tracer stylus T. Thus set up and angularly adjusted, the tracer stylus TS will be driven by the shaft 67 at a constant rate of speed of tracing movement around the master profile surface 4 and will, through the pantograph linkage P, cause movements at a constant rate of feed of the cutter spindle and milling cutter 27 in precise scaled reproduction of the movements of the reproducing tracer stylus TS around the master profile surface 4 to form on the work piece the oval profile surface MC2 at the required angle on the work piece.

Figure 2:
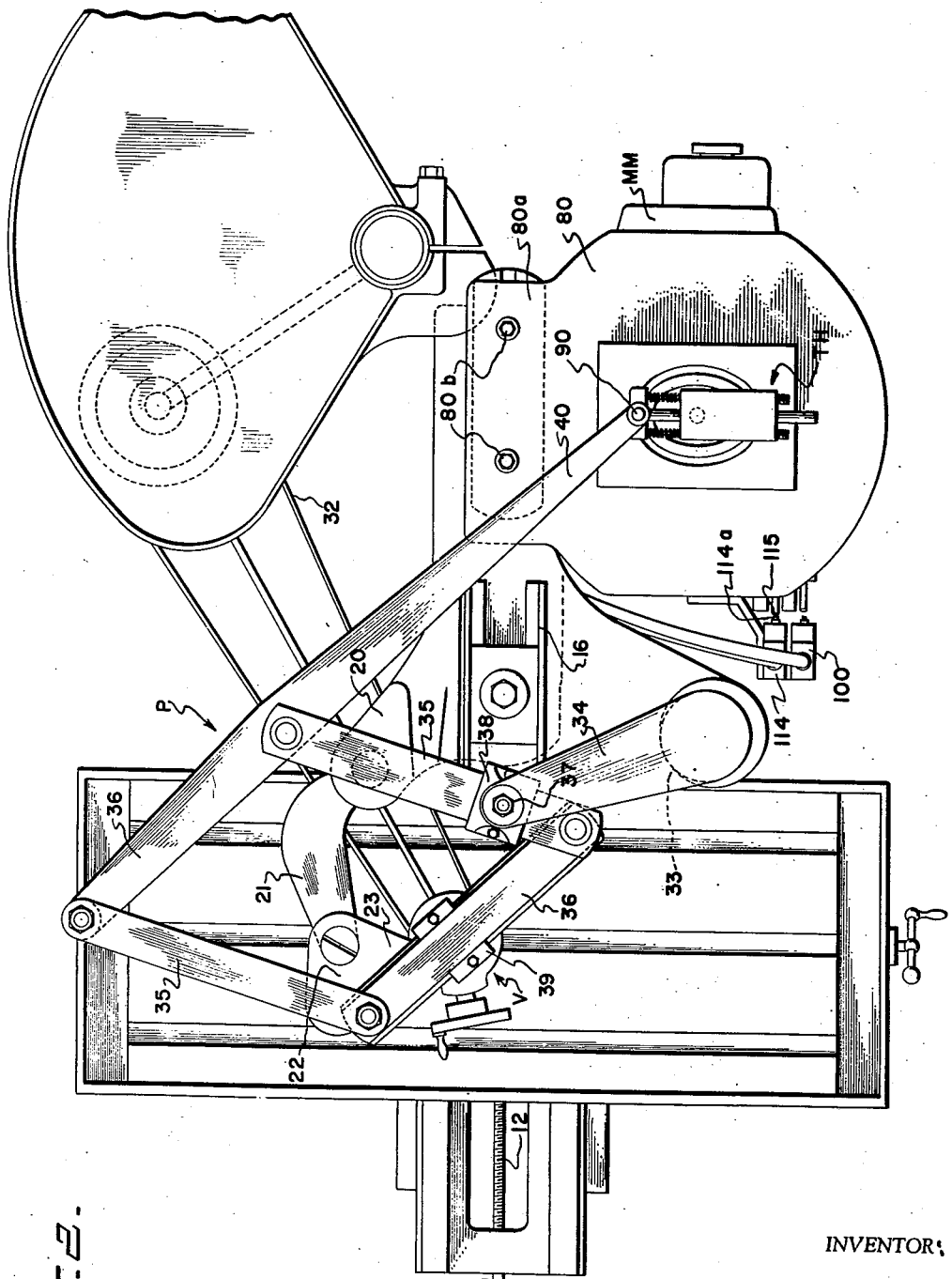
Fig. 2 is a view in top plan of the machine of Fig. 1.
Figure 11:
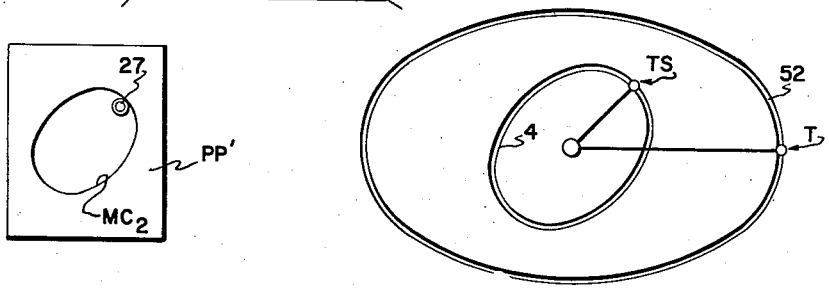
Figure 12:
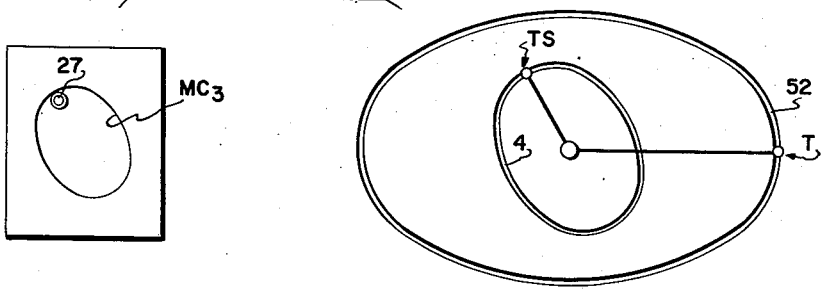
Figure 13:
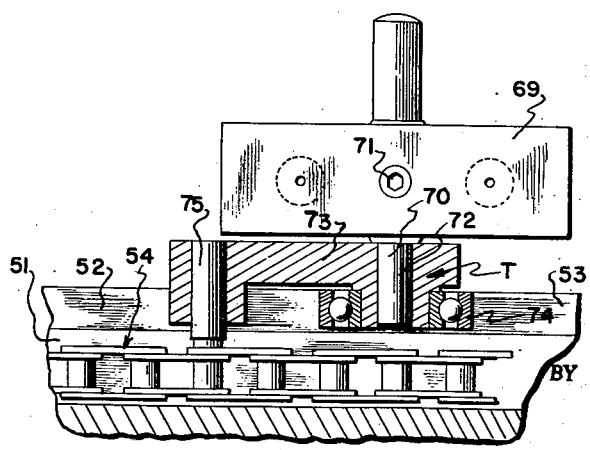
Fig. 13 is a detail fragmentary view in vertical section showing the coupling of the driving tracer stylus to its powered driving chain.

As a further example I have schematically illustrated in Fig. 12 of the drawings another set-up for profiling from the master MR an oval profile surface in the work piece at a different angle from the 180° angle of Figs. 1 and 2 and the 45° angle of Fig. 11. Referring to Fig. 12 an oval mold cavity having the oval profile surface MC3 is to be reproduced on the work piece in position at an angle inclined forwardly and to the left when facing the machine of approximately 30° to the cross axis of the worktable W and to the long or longitudinal axis of the oval master groove 52 which guides and controls the driving tracer stylus T through the oval path of movement constituting an approximately scaled enlargement of the oval profile MC3 of the work piece. The powered master unit M is set up for such profiling operation by positioning the master MR on the master mounting table 80 with the longitudinal or long axis of the oval master profile surface 4 thereof at precisely an angle of 30° to the long or longitudinal axis of the oval master groove 52 with the master profile surface being inclined forwardly and to the left when facing the machine. In other words, the master MR is mounted on table 80 to position the master profile surface 4 at precisely the same angle and in the same direction of inclination as the angle and direction of inclination of the profile surface MC3 that is to be profiled on the work piece as the precise scaled reproduction of the master profile surface 4. With the master MR so angularly set up on the table 80, the holder TH of the reproducing tracer stylus TS is then rotated on and around shaft 83 an angular distance of 120° from the tracer stylus holder H of the driving tracer stylus T and is then clamped in that position of adjustment so that the axis of the tracer spindle 90 of tracer stylus TS is positioned precisely 120° from the axis of the tracer pin 70 of the driving tracer stylus T.

From the foregoing it will be apparent that a powered master unit of my present invention permits of forming precise scaled reproductions on a work piece at any angle through 360° by merely angularly adjusting and setting the master profile surface and the driving tracer stylus and the reproducing tracer stylus in the manners as exemplified by the three (3) example angular settings disclosed and described hereinabove. In any position of angular adjustment through 360° the arrangement is such that a constant rate of feed of the milling cutter or tool in the work piece will be maintained through the angular adjustment of the reproducing stylus TS relative to the driving tracer stylus T to locate tracer stylus TS at the corresponding point around the master profile surface 4 at which the driving tracer stylus T is located relative to the master groove 52.

*Interchangeable masters*

A powered master unit of the invention, such as the master unit M of the example hereof, not only provides for and insures a constant rate of tool feed during the tracing and profiling cycles controlled and dictated thereby, but also enables the use interchangeably of a variety of different masters with any angular setting of a master on the master mounting table through 360° to meet the positional requirement of any particular profile surface to be formed on a work piece. Thus, with a single master unit as a component of a profiling or reproducing machine organization, operations may be carried out over a wide range of work pieces without requiring change in or substitution for the powered master unit itself. With a powered master unit of the invention it thus becomes possible to efficiently profile mill on a single work piece a plurality of profile surfaces set at different angular positions thereon by merely resetting the angular position of a master on the master mounting table and without changing masters if the profile surfaces on the work piece are to be identical. On the other hand, if the plurality of profile surfaces to be reproduced on the work piece, or any of them, are different as to shape or dimensions, then it is only necessary to consecutively interchangeably mount the proper masters for the respective profile surfaces to be reproduced.

*External profiling, grooving, and the like*

In the example machine of Fig. 1 and in the work examples of Figs. 10 and 11, the machine is set up primarily for so-called internal profiling, that is, for reproducing from the master the required profile on an internal surface of a work piece. Preferably, for such internal surface profiling the reproducing tracer stylus TS is continuously biased outwardly from its rotating holder TH into yielding tracing engagement against a master profile surface, such as the internal surface 4 of the master MR. Such biasing of the tracer stylus TS is effected by the form of tracer stylus holder TH in which the driver rod 86 and the tracer spindle 90 connected therewith are continuously yieldingly biased in a direction outwardly from the tracer stylus end of the holder. When it is desired to profile an external surface of a work piece or to mill, cut or grind a groove on the surface of a work piece as a precise scaled reproduction of a master profile surface of a master, it is preferable to use a form of reproducing tracer stylus holder in which the tracer stylus is continuously yieldingly biased in a direction inwardly toward the adjacent end of the tracer stylus holder.

As an example, I have illustrated in Figs. 8 and 9 such a form of external surface profiling or grooving tracer holder TH'. The tracer stylus holder TH' of the example hereof for external profiling and grooving includes the case 84 having thereon the mounting hub 85 substantially identical with the corresponding components for the holder TH. A driver rod 86' is reciprocally mounted in the case 84 in horizontally disposed position with its opposite ends extending outwardly beyond the opposite ends, respectively, of the case. The driver rod 86 is slidably mounted in the spaced linear bearing assemblies 86c mounted in the case 84 adjacent the opposite ends thereof. In a tracer stylus holder of the form of TH', the forward end of the driver rod 86' is provided with a head 87' having a vertical bore 87c therethrough and mounting therein a suitable bushing 87a adapted to receive therethrough and mount therein the tracer spindle 90 of the reproducing tracer stylus TS. The driver rod 86 and its head 87' are spring loaded and continuously biased in a direction inwardly toward the end of the case 84' at which the head 87' is located. The case 84 is provided with the horizontal bores 88c therein spaced at opposite sides of and parallel with the driver rod 86'. The bores 88c are internally tapped at the forward ends thereof and are closed at such ends by the externally threaded plugs 88d threaded a distance thereinto. The rear end of the driver rod 86' opposite the head 87' is provided with a cross head 89a fixed thereto and spaced parallel guide rods 88' are connected at their outer ends to the inner side of the head 89a and extend horizontally inwardly into the parallel bores 88c. Coil expansion springs 89' are mounted and confined in the bores 88c of case 84 between the inner ends of the plugs 88d and the inner side of the head 89a with the guide rods 88' extending through, surrounded by, and centering the springs, as will be clear by reference to Fig. 9. Thus the driver rod 86' with its head 87' is continuously biased in a direction inwardly of the forward end of the case 84, that is, is continuously biased in a direction to retract the driver rod 86' into case 84' and move head 87' inwardly toward the adjacent forward end of the case.

With the tracer stylus holder TH' substituted for the tracer stylus holder TH in order to perform profiling on an external surface of a work piece or to form a groove on that work piece, the driver rod 81' is drawn outwardly against the forces of the springs 89' to a position with the reproducing tracer stylus roller 91 in tracing engagement with the outer or external profile surface 5 of the master MR and with the springs thus continuously yieldingly biasing the tracer spindle 90 and the tracer roller 91 inwardly so that the tracer roller 91 is maintained in yielding tracing engaging against the master profile surface 5. With the tracer stylus holder TH' the movements radially inwardly of the reproducing tracer stylus TS in following and tracing the master profile surface 5 are effected by the baising springs 89', while movements radially outwardly of the reproducing tracer stylus are effected by the master profile surface 5 forcing the tracer stylus radially outwardly against the forces of the springs 89' as the tracer stylus enters onto and traces along portions of the profile surface of increasing radial distances from the axis of the driving shaft 67.

An automatic milling cycle

In the milling cycle with the machine set up as shown in Fig. 1 for milling the internal profile surface MC1 located by the work piece PP at an angle of 180° to the cross axis of the worktable and to the long axis of the master groove 52, the powered operation of the driving tracer stylus T from the motor MM may be started with the driving tracer stylus T located at any desired point around its path of movement defined by the master groove 52 and with the reproducing tracer stylus TS positioned an angular distance of 90° therefrom around the master profile surface 4. It will be noted that with the angular setting of the master profile surface 4 relative to the master groove 52 and with the angular setting of the reproducing tracer stylus TS relative to the driving tracer stylus T that when the tracer stylus T is, for example, at the center of one end of the master groove 52, the tracer stylus TS will be at the center of an end of the oval master profile surface 4. Such relative positioning will, of course, be maintained completely around the tracing paths of the tracer stylus T and the tracer stylus TS so that at every point therearound the reproducing tracer stylus TS will be at a point on the master profile surface 4 precisely corresponding to the point at which the driving tracer stylus T is located in the master groove 52 relative to the profile of that groove. The same conditions will, of course, prevail with the angular settings of the examples of Figs. 11 and 12, as well as for all angular settings through 360° of a profile surface to be reproduced on a work piece with the master profile surface and the driving tracer stylus T and the reproducing tracer stylus TS correspondingly angularly adjusted and set.

Assuming that the profiling cycle is started with the driving tracer stylus T and the reproducing tracer stylus TS in a position as shown in Fig. 10, then once the operator has placed the driving motor MM in operation, the driving tracer stylus T is driven thereby along the master groove 52 by the endless chain 54 and the powered transmission driving that chain as hereinbefore described. Movement of the driving tracer stylus T through and along the master groove 52 rotates the shaft 67 through the medium of the tracer stylus holder H with the driver rod 68 of such holder freely reciprocating therein in accordance with the varying radial distances between shaft 67 and the tracer stylus T as presented to that tracer stylus as it is moved around and is guided by and constrained to the oval or elliptical path defined by such master groove. The powered rotation of the shaft 67 by the driving tracer stylus T and its holder H is transmitted to the reproducing tracer stylus holder TH so that the reproducing tracer stylus TS connected therewith is moved along and around the master profile surface 4 of the master MR with the tracer roller 91 of tracer stylus TS being continuously yieldingly maintained in rolling tracing engagement with the master profile surface. As the radial distances between the axis of shaft 67 and the master profile surface 4 vary around the oval or elliptical path defined by the surface 4, the rod 86 is reciprocated in the holder TH with the movements inwardly of the tracer stylus TS, forcing the driver rod 86 inwardly against the force of the biasing springs 89 as the tracer roller 91 encounters and follows around those sections of the master profile surface which are at the lesser or decreasing radial distances from the shaft 67 and with the outward movements of the driver rod 86 being effected by the outward biasing forces applied to the tracer stylus TS by the biasing springs 89 as the tracer roller 91 reaches and moves along sections of the master profile surface 4 of greater or increasing radial distances from the shaft 67.

The movements radially inwardly and outwardly of the reproducing tracer stylus TS and the movements thereof angularly around the axis of the shaft 67 as the tracer stylus TS moves through and around its tracing cycle under the control and dictation of the master profile surface 4, are transmitted by the tracer spindle 90 to the tracer arm 40 of the pantograph linkage P and through that linkage to the cutter spindle unit V and the cutter spindle 25 thereof, as movements in precisely scaled reproduction of the movements of the tracer stylus TS, so that a cutting tool on the cutter spindle, say the milling cutter 27 hereof, will mill a profile surface on a work piece in exact scaled reproduction of the master profile surface. The power driven tracing movements of the reproducing tracer stylus TS around the oval path defined by the master profile surface 4 are continued in the specific set-up of the example machine through one complete revolution of the driving shaft 67, so that the tracer stylus TS makes one complete pass or tracing cycle around the profile surface 4. In accordance with a feature of the invention as exemplified in the particular set-up of the example machine, upon completion of the tracing cycle the power drive of the reproducing tracer stylus TS and of the profile milling cycle of the cutter spindle 25 actuated thereby, are stopped automatically.

In carrying out the automatic tracing and milling cycles as referred to above in the example machine, I provide a gear box 92 at the underside of the gear box 60 in position depending therebelow. The chain drive shaft 62 which is journaled in the gear box 60 is extended downwardly into gear box 92 to form the shaft 92a as a continuation of drive shaft 62. A driven cam shaft 93 is mounted and journaled in horizontally disposed position extending across gear box 92 and is placed in driven connection with the shaft 92a by a suitable gear set, such as the worm 93a and the worm wheel 93b. The shaft 93 is positioned with its axis disposed from front to rear, that is, crosswise of the machine and normal to the axis of the input shaft 61 of the gear box 60.

In this instance the driven cam shaft 93 makes one revolution with multiple revolutions of the powered drive shaft 67 of the master unit M and the reproducing tracer stylus TS thereof which is driven thereby. A tracing and milling cycle control switch 100 is mounted and supported by a bracket or the like 100a in position spaced from the cam shaft 93 at the outer side thereof. This switch 100 includes a switch actuating plunger 101 which is located in horizontally disposed position and projects outwardly from the switch 100 toward the cam shaft 93. This plunger 101 is mounted for reciprocation in the switch 100 in position with a projection of its axis intersecting and at right angles to the axis of the cam shaft 93. An operating pin 102 is fixed to and revolved with the cam shaft 93 in position extending radially therefrom with its axis in the vertical plane in which the axis of the switch actuating plunger 101 lies. The length of the pin 102 is such that the outer end thereof, which may be rounded or which may have mounted thereon an antifriction roller, will when rotated into line with the switch actuating plunger 101, engage and thereby depress such plunger. Thus it follows that upon each revolution of the cam shaft 93, the operating pin 102 thereon will engage against and depress the switch actuating plunger 101. The tracing and milling cycle control switch 100 is connected into the control circuits for the powered master unit driving motor MM in such a manner that when the switch actuating plunger 101 is engaged and depressed by the operating pin 102, the motor MM is stopped to thereby stop tracing and milling operations with the pin 102 raised in engagement with and depressing the switch plunger 101, all as will be more fully described and explained in connection with the power and control circuits for the machine.

In the example machine the set-up is such that upon the completion of each tracing and milling cycle constituted by one revolution of the driving shaft 67 of the powered master unit M and one complete passage of the tracer T around the master groove 52 and of the reproducing tracer stylus TS around the master profile surface 4 of the master MR, the operation of such components is stopped with the operating pin 102 of cam shaft 93 engaged with and depressing the switch actuating plunger 101 with the switch 100 and the control circuits for the motor MM conditioned for operation to start the next cycle by manual operation of the start switch SS which is located in readily accessible position at the forward side of the master unit M.

*Automatic feed of the worktable*

The worktable W is mounted on and vertically movable between a lowered position for work piece unloading therefrom and a raised position at which a work piece thereon has been fed to the cutting tool, say the milling cutter 27 of this example. Such vertical movements between milling and unloading positions are effected by the hydraulic cylinder and piston unit A which is connected with the vertically movable knee K on which the worktable W is mounted. The raising and lowering of the worktable W between work piece milling and work piece unloading positions is controlled from the cam shaft 93 in an interlocked relationship with the automatic tracing and milling cycles of the powered master unit M and the cutter spindle unit V.

The hydraulic cylinder and piston unit A is selectively controlled by and from a four-way valve unit 103 which is mounted in position on and depending vertically downwardly from the underside of a horizontally disposed supporting arm 104 that is fixed to the upper end of a vertical post 105. The post 105 is mounted on and extends vertically upwardly from a laterally outwardly extending bracket plate 106 which is fixed on and carried by the knee K for vertical movements therewith upwardly and downwardly in a straight-line path as the knee is raised and lowered by the cylinder and piston unit A between its work piece milling and work piece unloading positions. Thus the valve unit 103 and its supporting structure formed by arm 104, vertical post 105, and bracket arm 106 are carried by and moved as a unit structure upwardly and downwardly with the assembly of knee K, saddle S, and work table W. The valve unit 103 includes the follower pin 107 which extends vertically upwardly a distance above the supporting arm 104 from which the valve unit is hung. The four-way valve unit 103 is connected by suitable pressure fluid lines in the usual manner with the cylinder 10 of the hydraulic cylinder and piston unit A so that in one operating position of the valve unit the plunger rod 11 of the cylinder is forced downwardly to lower the worktable to its down or work-unloading position and in the other operating position of the valve unit the pressure fluid is cycled to act on the cylinder plunger rod 11 in a direction to force that rod upwardly and feed the worktable W upwardly to feed a work piece thereon to the cutting tool. The valve unit 103 is connected into the pressure fluid lines between a suitable source of pressure fluid (not shown) and the cylinder 10 of the piston and cylinder unit A in a manner well known and familiar in this art so that it is unnecessary to make a detailed disclosure thereof herein. The selective operation of the valve unit 103 to thereby selectively control the vertical up and down movements of the worktable W on the cylinder and piston unit A, is controlled by the usual solenoid 108 which in this instance is mounted at the lower side of the valve unit in operative connection with the valve mechanism of the unit, all in a manner familiar in the art.

The follower pin 107 which projects upwardly from the supporting arm 104 is adapted to slidably engage and follow a cam surface on a cam 109 which is mounted on the cam shaft 93 in position above the pin. The cam 109 is provided with the cam surface 110 which is positioned above and vertically aligned with the axis of the follower pin 107. The cam surface 110 in this example progressively decreases in radial distance from the axis of the cam completely therearound from a high point or lobe 111 to a low point 112 located spaced radially inwardly from and positioned substantially on the same radius of the cam as the high point.

The four-way valve unit 103 which controls the vertical movements upwardly and downwardly of the worktable W through the hydraulic cylinder and piston unit A includes the solenoid 108 for selectively setting the valve unit to either cause the cylinder and piston unit A to raise the worktable W or to lower that table. The solenoid 108 of the control valve unit 103 is connected into a suitable electrical circuit which is controlled by and from a microswitch 114 mounted and supported on the switch mounting bracket 100a immediately adjacent to and at the inner side of the powered master unit cycle controlling switch 100. The switch 114 includes the horizontally disposed actuating plunger 114a.

An operating pin 115 is mounted on and rotated with the cam shaft 93, being positioned thereon extending radially outwardly therefrom in position for engagement of its outer end with the switch plunger 114a when such pin is rotated to position opposite and aligned with the plunger. The cam shaft 93 and cam 109 thereon are rotated in a counterclockwise direction when facing the right-hand side of the machine and the switch operating pin 115 is in this example located in a position on the cam shaft 93 advanced therearound 5° to 10° ahead of the operating pin 102 for the switch 100.

At the start of the automatic cycle of the example machine the worktable W is at its down or lowered position with the valve unit 103 and its cam follower pin 107 in position lowered therewith and spaced below the valve unit controlling cam 109. In this lowered, work-unloading position of the worktable W and the valve unit 103 the high point or lobe 111 of cam 109 is positioned above and in vertical alignment with the follower pin 107 so that an upward projection of the axis of that pin intersects the high point 111. In this lowered starting position the switch operating pin 115 is in position moved past and out of engagement with the switch plunger 114a of the solenoid valve controlling switch 114, while the switch operating pin 102 is in position engaged with and depressing the plunger 101 of the cycle controlling switch 100.

The automatic tracing and profiling cycles and the automatic worktable feed cycle are all manually initiated by operation of the start switch SS. Starting operation of the switch SS closes the control circuit to the operating solenoid 108 of the control valve unit 103 to set that unit to cause upward feed of the worktable W by the cylinder and piston unit A. Operation of the start switch SS also sets the master unit motor MM into operation and starts the tracing and profiling cycles of the master unit, as hereinbefore described. The upward feeding movement of the worktable W carrying with it the control valve unit 103 continues until the follower pin 107 engages at its upper end against the high point 111 of the cam 109. The initiation of operation of the powered master unit M by the motor MM also starts the drive of the cam shaft 93 with rotation thereby of the cam 109 in a counterclockwise direction, thus moving pin 102 from engagement with and releasing plunger 101 of the switch 100. As the cam 93 rotates in the counterclockwise direction, the upward feed of the worktable W by the cylinder and piston unit A continues, thus forcing and maintaining the follower pin 107 in engagement with the cam surface 110 so that the cam permits progressive upward feed of the worktable W and of a work piece thereon relative to the cutting tool, such as the milling cutter 27, and thus effects a progressive feed of that cutter into the work piece. As the cam 109 nears the completion of one revolution thereof, the pin 115 moves into alignment with and engages and depresses the plunger 114a of the switch 114 and sets that switch to cause actuation of the solenoid 108 of the control valve unit 103 to reverse the pressure fluid cycling in the cylinder and piston unit A with that unit then lowering the worktable W and the work piece thereon. At an interval of time thereafter sufficient for the worktable W to reach its lowered or unloading position, the switch operating pin 102 on the cam shaft 93 aligns with and engages and depresses the plunger 101 of the master unit cycle control switch. Operation of the switch 100 by pin 102 stops operation of the master unit driving motor MM and the tracing and milling cycles of that unit. Stopping the motor MM stops the drive of the cam shaft 93 and cam 109 thereon with the pin 102 remaining in position at rest in engagement with and depressing the plunger 101 of the cycle control switch 100. Also, with the stopping of the cam shaft 93 and cam 109 the high point 111 on the cam surface comes to rest above and in vertical alignment with the follower pin 107 which is then positioned therebelow with the worktable W in its lowered, work unloading position.

The machine of Fig. 1, as hereinabove described, is set up for profiling an oval-shaped internal surface MC1 on the work piece PP and in such set-up with the particular work piece being worked upon the cutter spindle 25 with the milling cutter 27 thereon makes one complete pass for each tracing and milling cycle of the master unit M. At the end of such complete pass the cycle control switch 100 is operated by the pin 102 to stop the operation. The cam shaft 93 is timed to also make one revolution for each complete tracing and profiling cycle. However, if the machine is set up for milling out a groove or the like formation on the surface of a work piece, it is preferable that the cycle be stopped at every 180°, in other words, that the operation be stopped and started once during each complete pass around the groove being formed in the work piece. In the present example, this is accomplished by providing a switch operating pin 102' on the cam shaft 93 in position diametrically opposite and axially aligned with the pin 102. The pin 102' extends radially outwardly from the cam shaft 93 and is of a length to engage and depress the plunger 101 of the cycle control switch 100 when the cam shaft has moved through an angular distance of 180°, that is, through one-half revolution from its start of operation. This pin 102' is preferably removably mounted on the cam shaft 93 as by threading it into a tapped bore extending radially through a suitable collar 102a fixed on the outer end of the cam shaft, all as will be clear by reference to Fig. 6.

*Example power and control circuits*

Figure 14:
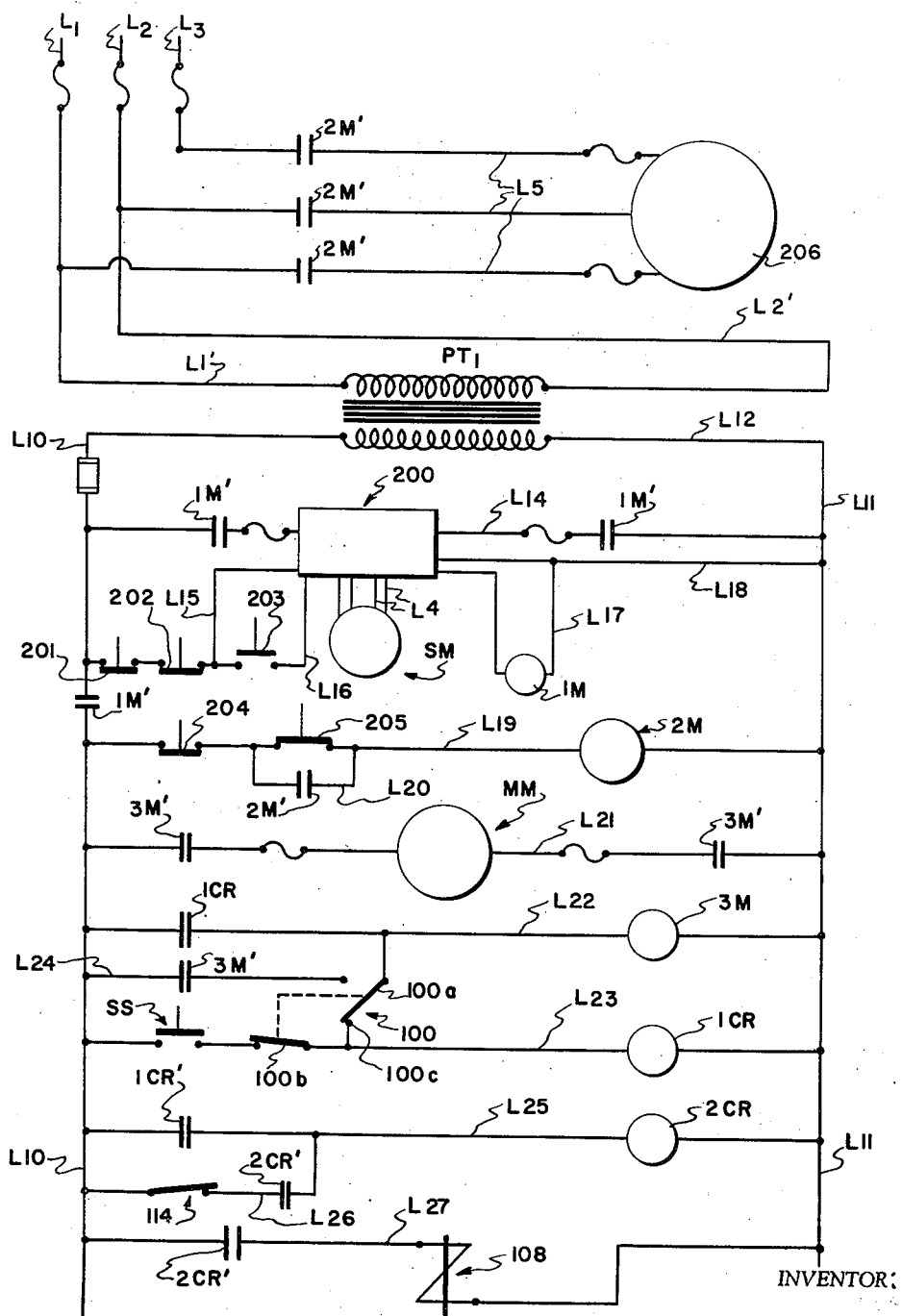
Fig. 14 is a schematic wiring diagram of the power and control circuits for the machine of Fig. 1.

A power and control circuit network for the example machine hereof is disclosed in Fig. 14 for carrying out the operations and cycling of that particular machine in the manner hereinbefore described. The power circuit in the example network of Fig. 14 includes the power lines L1, L2 and L3 which are supplied with and carry, say, 440 volt, 3 phase, A. C. current. Power lines L1 and L2 are connected by lines L1' and L2' into the primary winding of a main power transformer PT1. The secondary of the power transformer PT1 is connected across the control circuit lines L10 and L11 of the control circuit network by the circuit line L12.

A circuit line L14 is connected across lines L10 and L11 and has connected therein the electrically controlled variable speed unit 200 which controls the rate of speed of the spindle motor SM. The spindle motor SM is suitably supplied in this example with D. C. current by the supply lines L4 in the usual manner. A main stop switch 201 and a stop switch 202 are connected in a circuit line L15 which, in turn, is connected into the circuits of the variable speed drive 200. A start switch 203 is connected in a circuit line L16 which connects across line L15 between the variable speed drive 200 and the stop switch 202. A contactor 1M is connected into a circuit line L17. The circuit line L17 connects into the circuit line L18. The contactor 1M includes the sets of normally open contacts 1M' connected in circuit line L14 and the set of normally open contacts 1M' connected in the circuit line L10 at the side of circuit line L15 opposite circuit line L14. Thus, with the circuit through contactor 1M open the sets of contacts 1M' are open in the circuit line L14 and the set of contacts 1M' in circuit line L10 are open so that all of the control circuits connected with circuit line L10 at the side of line L15 opposite the point of connection with circuit line L14 in circuit line L10, are open and inactive.

A circuit line L19 is connected across circuit lines L10 and L11, being connected into circuit line L10 at a point to locate the set of normally open contacts 1M' in circuit line L10 between circuit line L15 and the said circuit line L19. A contactor unit 2M is connected in circuit line L19 and a normally closed stop switch 204 is also connected in circuit line L19 between the contactor unit 2M and the circuit line L10. A start switch 205 is connected in circuit line L19 between the contactor unit 2M and the stop switch 204. A holding circuit line L20 is connected into circuit line L19 around and bridging the start switch 205. The contactor unit 2M includes a set of normally open contacts 2M' connected into the circuit holding line L20.

A circuit line L21 is connected across circuit lines L10 and L11 and has connected therein the master motor MM. A circuit line L22 is connected across circuit lines L10 and L11 at the side of circuit line L21 opposite circuit line L19 and this circuit line L22 has connected therein the contactor unit 3M. A circuit line L23 is connected across the circuit lines L10 and L11 at the side of circuit line L21 opposite circuit line L19. This circuit line L23 has connected therein a circuit relay 1CR. The cycle start switch SS for the master unit M is connected in the circuit line L23 between the circuit relay 1CR and the circuit line L10. A bridging or holding circuit line L24 is connected into the circuit line L10 at a location between the circuit lines L22 and L23. Holding circuit line L24 is connected into the circuit line L22 at a location between the contactor unit 3M and the circuit line L10.

The cycle control switch 100 is connected in this circuit line L24 and includes a movable switch member 100a operable between a position opening and a position closing circuit line L24. The switch 100 includes a switch member 100b connected into the circuit line L23 between the start switch SS and the circuit relay 1CR, switch member 100b being interlocked as indicated by the dotted line with the switch member 100a in circuit line L24. Switch member 100b is operable between a position opening and a position closing circuit line L23. A switch contact point 100c is connected into circuit line L23 between the switch member 100b and the circuit relay 1CR for contact by the switch member 100a when that member is in position opening circuit line L24. When switch member 100a is in its other position closing the circuit line L24, it is disengaged from and out of electrical contact with the contact 100c.

A circuit line L25 is connected across circuit lines L10 and L11 at the side of the circuit line L23 opposite the circuit line L22. Circuit line L25 has connected therein the circuit relay 2CR. A bridging or holding circuit line L26 is connected between circuit line L10 and the circuit line L25 at the side of the latter opposite circuit line L23. This circuit line L26 is connected into the circuit line L25 at a point between circuit line L10 and the circuit relay 2CR. A circuit line L27 is connected across circuit lines L10 and L11 at the side of circuit line L25 opposite circuit line L23. The operating solenoid 108 of the control valve unit 103 for the cylinder and piston unit A of the hydraulic worktable feed is connected into this circuit line L27.

The contactor unit 3M which is connected in circuit line L22 includes the sets of normally open contacts 3M' that are connected in circuit line L21 at opposite sides of the master motor MM and the set of normally open contacts 3M′ connected in the circuit line L24. When the circuit is closed through contactor unit 3M, its sets of normally open contacts 3M′ are closed, and when the circuit is opened through the contactor unit 3M, the sets of contacts 3M′ restore to normally open positions.

The circuit relay 1CR connected in circuit line L23 includes a set of normally open contacts 1CR′ connected in circuit line L22 between the point of connection of the holding circuit line L24 into line L22 and the circuit line L10. The circuit relay 1CR also includes a set of normally open contacts 1CR′ in circuit line L25 between the circuit line L10 and the point of connection of the bridge circuit line L26 into the circuit line L25. Closing the circuit through the relay 1CR effects closing of the sets of normally open contacts 1CR′. Opening the circuit through relay 1CR causes the sets of contacts 1CR′ to restore to their open positions.

The circuit relay 2CR in the circuit line L25 includes a set of normally open contacts 2CR′ connected in the circuit line L26 between the circuit line L10 and the point of connection of line L26 into circuit line L25. The relay 2CR also includes a set of normally open contacts 2CR′ connected in the circuit line L27 between the circuit line L10 and the solenoid 108. When the circuit is closed through relay 2CR, its sets of contacts 2CR′ are closed, and when the circuit is opened through the relay 2CR, its sets of contacts restore to their normal open positions.

The automatically operated switch 114 that controls the cycle operation of the hydraulic feed for the worktable W of the example machine, is connected in the holding circuit line L26 between the circuit line L10 and the set of normally open contacts 2CR′ of the circuit relay 2CR. This switch 114 is of the normally closed type and, as hereinbefore described, is automatically operated to open position by the switch operating pin 115 on the cam shaft 93 of the machine.

In carrying out the cycles of operations, as hereinbefore described for the example machine, the power and control circuits as schematically disclosed in Fig. 14 have the following general operation and functioning:

The spindle motor SM is placed into operation by closing switch 203 with the stop switches 201 and 202 in closed positions. The closing of the circuits controlled by switch 203 closes the circuit through the contactor unit 1M in circuit line L17. The closing of the circuit through contactor 1M effects the closing of the sets of normally open contacts 1M′ including the set connected in the circuit line L10. Thus all of the control circuits in the control network beyond the set of contacts 1M′ in circuit line L10 are conditioned for operation.

The start switch 205 is closed with the stop switch 204 in closed position. This results in the closing of the set of contacts 2M′ in the holding circuit line L20 around switch 205. A pump motor 206 with a hydraulic system for the hydraulic work-table feed may be considered to be included in the example machine. This motor 206 is supplied with power by the branch lines L5 connected into the power lines L1, L2 and L3. Sets of normally open contacts 2M′ of the contactor unit 2M are connected into the branch lines L5. Thus, when the start switch 205 is closed, the power circuit to the motor 206 is closed and that motor immediately starts operation to provide the pressure fluid for the hydraulic system which includes the control valve unit 103 and the cylinder and piston unit A.

The cycle start switch SS may then be closed to set into operation the automatic tracing, worktable feeding and milling cycles. Closing switch SS with the automatic cycle switch 100 in the position in which it was set at the end of the last cycle results in closing the circuits through the circuit relay 1CR in circuit line L23. Activation of relay 1CR closes its set of contacts 1CR′ in circuit line L22 and its set of contacts 1CR′ in circuit line L25. Thus the contactor unit 3M is activated to close its sets of contacts in circuit line L21 so that the master motor MM is placed in operation. The set of contacts 3M′ in the circuit holding line L24 are also closed. Simultaneously, the sets of contacts 1CR′ in circuit line L25 are closed to thus activate the circuit relay 2CR and result in closing the holding circuit L26 in which switch 114 is connected and in closing circuit line L27 through the solenoid 108 of the control valve unit 103. Control valve unit 103 is thus set in its position for upward feed of the worktable W.

As the master unit M approaches completion of its tracing and milling cycles, the switch operating pin 115 engages the switch 114 and opens that switch to thereby open the circuit through the solenoid 108 of the control valve unit 103 with the result that up-feed of the worktable W is stopped and downfeed is started in advance of the completion of the milling cycle by the master unit M. Following the initiation of the worktable downfeed by the opening of the switch 114, the master unit reaches the end of its millig cycle and the switch operating pin 102 engages the cycle control switch 100 and the circuit is opened through the contactor 3M, and thereby causes opening of the sets of contacts 3M′ in the circuit line L21 through the master motor MM so that the operation of that motor is stopped to stop the tracing and milling cycle of the master unit M. The circuits are then in condition for the start of a new tracing and milling cycle by closing the start switch SS.

It is to be understood that the power and control circuits for the example machine as disclosed and hereinabove reviewed are not presented by way of limitation, but primarily for purposes of explaining operative circuits for such machine as set up for performing milling operations on the particular work piece and of the specific profile shapes illustrated and explained herein. Various other power and control circuit arrangements for performing and carrying out various cycles of operations in tracing and reproducing from various shapes of masters on various kinds of work pieces, may be utilized to meet the conditions and requirements of each particular reproducing operation, as will be readily apparent to and understood by those skilled in the arts to which my present invention relates.

The general shapes of the profile surfaces which happen to have been selected as those to be reproduced on the work pieces of the example hereof for purposes of explaining the invention and the several features thereof, are of symmetrical oval or elliptical form. The term "oval" or "elliptical" is used herein and in the appended claims in the broadest sense to include any and all profile shapes having major axes of different lengths, whether the profile is of symmetrical or non-symmetrical shape. And, while the profiles disclosed and specifically discussed herein are "endless," it is to be understood that my invention is not intended to be and is not limited to reproduction of only "endless" profile surfaces in the sense of an oval, circular, or closed profile, but includes the reproduction of profile surfaces of various forms in which the opposite ends of the surfaces thereof do not meet or join. In other words, profile surfaces may be reproduced from suitable masters which are straight, that is, linear, or which are curved as simple or compound curves, as distinguished from the "endless" profile surfaces of the illustrated examples herein described.

It will also be evident that various other modifications, changes, variations, designs, constructions, additions, substitutions, eliminations, combinations and sub-combinations may be resorted to without departing from the broad spirit and scope of my invention, and hence I do not desire or intend to limit or restrict my invention to the exact and specific embodiment thereof as expressed in the example hereof, except as may be required by any specific and intended limitation thereto appearing in any of the claims hereto appended.

What I claim is:

1. In a powered master unit, in combination, a base having thereon an endless master surface providing a profile at least approximating the profile of a surface to be formed on a work piece; a table providing a master mounting surface thereon generally parallel with and spaced from said base; a master mounted on said mounting surface of said table and having thereon a master profile surface constituting a precise scaled reproduction of the surface to be reproduced therefrom on a work piece; said master profile surface of said master being positioned in its plane angularly displaced around and relative to said master surface on said base; a driving tracer stylus mounted for movements along said master surface on said base; a reproducing tracer stylus mounted for movements in tracing engagement with and around said master profile surface; said driving tracer stylus and said reproducing tracer stylus mounted for movements about a common axis normal to the planes of said endless master surface and said endless master profile surface; powered means for moving said driving tracer stylus around said endless master surface; means operatively connecting said driving tracer stylus with said reproducing tracer stylus for driving the latter from said driving tracer stylus; and said reproducing tracer stylus being located in a position angularly displaced around said master profile surface relative to the position of said driving tracer stylus along said master surface through an angle equal to the angle at which said master profile surface is set around and relative to said master surface.

2. In a powered master unit, in combination, an endless master surface having a profile at least approximating the profile of a surface to be formed on a work piece; an endless master profile surface spaced from and in a plane generally parallel with the plane of said master profile surface; said master profile surface having a profile constituting a precise scaled reproduction of the profile of the surface to be formed on a work piece and being located in its plane in a position angularly displaced around and relative to the position of said master surface in its plane; a driving tracer stylus mounted for movements around said master surface; a reproducing tracer stylus mounted for movements in tracing engagement with and around said master profile surface; said reproducing tracer stylus being set in position displaced around said master profile surface through an angle from the position of said driving tracer stylus equal to the angle at which said master profile surface is set around and relative to said master surface; means for driving said driving tracer stylus around said master surface; and means connecting said reproducing tracer stylus with said driving tracer stylus for moving said reproducing tracer stylus by and simultaneously with said driving tracer stylus in said angular relationship therewith in the same direction around said master profile surface and said master surface, respectively.

3. In a powered master unit, in combination, a master surface; a master profile surface spaced from and located in a plane generally parallel with the plane of said master surface; said master profile surface being located in its plane in a position angularly displaced around and relative to the location of said master surface in its plane; a driving tracer stylus mounted for movements along said master surface; a reproducing tracer stylus mounted for movements along said master profile surface; said reproducing tracer stylus being set in a position displaced along said master profile surface from said driving tracer stylus in a fixed relation with the latter through an angle equal to the angle through which said master profile surface is displaced along and relative to said master surface; and means for moving said driving tracer stylus and said reproducing tracer stylus simultaneously in the same direction around said master surface and said master profile surface, respectively.

4. In combination, in a powered master unit, a master surface; a driving tracer stylus mounted for movements along said master surface; a master profile surface; a reproducing tracer stylus mounted for movements in tracing engagement with and along said master profile surface; said reproducing tracer stylus being mounted for infinite adjustment around said master surface to any desired position of adjustment therealong relative to the position of said driving tracer stylus along said master surface; means for releasably securing said reproducing tracer stylus in any position of adjustment thereof in a fixed angular relation with said driving tracer stylus; said reproducing tracer stylus being operatively connected with said driving tracer stylus and being movable around said master profile surface by and simultaneously with movements of said driving tracer stylus around said master surface; and powered means connected with said driving tracer stylus for moving said driving tracer stylus around said master surface.

5. In combination, in a powered master unit, a master surface, a driving tracer stylus mounted for movements along said master surface; powered means for moving said tracer stylus along said master surface; a master profile surface; a reproducing tracer stylus mounted for movements in tracing engagement with and along said master profile surface; said reproducing tracer stylus being operatively connected with and being moved along said master profile surface by movements of said driving tracer stylus along said master surface; said master profile surface being mounted for adjustment around and relative to said master surface to angular positions of adjustment therearound; said reproducing tracer stylus being also mounted for adjustment independently of said driving tracer stylus along said master profile surface to positions of angular adjustment relative to said driving tracer stylus; and means for releasably securing said reproducing tracer stylus in any position of angular adjustment thereof relative to said driving tracer stylus.

6. In a powered master unit, in combination, a rotary driving shaft; a master surface around and in a plane normal to the axis of said shaft; a driving tracer stylus mounted for movements around said master surface through a path about the axis of said shaft; powered means for moving said driving tracer stylus around said master surface; said rotary shaft being connected with said driving tracer stylus for rotation by movements of said driving tracer stylus therearound along said master surface; a master profile surface around and in a plane normal to the axis of said shaft; a reproducing tracer stylus mounted for movements around said master profile surface; said reproducing tracer stylus being connected with and movable by rotation of said shaft through a path in tracing engagement around said master profile surface about said shaft as an axis; said reproducing tracer stylus being adjustable around and independently of said shaft to infinite positions of angular adjustment therearound relative to said driving tracer stylus; and means for releasably securing said reproducing tracer stylus in any position of angular adjustment thereof relative to said driving tracer stylus.

7. The combination in a master unit, of, a driving tracer stylus mounted for movements along a profile path about an axis normal to the plane of said path, and means for moving said driving tracer stylus along said profile path, with, a reproducing tracer stylus mounted for movements along a profile surface located in a plane spaced from and generally parallel with the plane of said profile path, said reproducing tracer stylus being mounted for adjustment through infinite angles of adjustment along said profile surface relative to the position of said driving tracer stylus along said master surface; and means for releasably securing said reproducing tracer stylus in any angular position of adjustment thereof.

8. The combination in a master unit of a profile surface, a driving tracer stylus movable along said profile surface about an axis normal to the plane of said profile surface, and means for moving said driving tracer stylus along said profile surface, with, a master profile surface spaced from and located in a plane substantially parallel with the plane of said profile surface, said master profile surface being positioned in its plane at an angle around and relative to the position of said profile surface in its plane, a reproducing tracer stylus mounted for movements along said profile surface, and said reproducing tracer stylus being set at the same angle relative to said driving tracer stylus as said master profile surface is set relative to said first-mentioned profile surface.

9. In a powered master unit, in combination, a rotary driving shaft; a master surface spaced from and around and in a plane generally normal to the axis of said driving shaft; a driving tracer stylus mounted for movements along said master surface about the axis of said shaft; said driving tracer stylus being connected with said driving shaft for rotating said shaft by movements of said driving tracer stylus along said master surface; said driving tracer stylus being also freely movable in either direction radially relative to said shaft toward and from said master surface; a master profile surface around said driving shaft located in a plane spaced from said master surface and substantially normal to the axis of said shaft; a reproducing tracer stylus connected with and movable by rotation of said shaft in tracing engagement with and around said master profile surface about said shaft as an axis; said reproducing tracer stylus being mounted for movements radially relative to said driving shaft toward and from said master profile surface; said reproducing tracer stylus being also mounted for adjustment angularly around and independently of said shaft to infinite positions of angular adjustment therearound relative to the position of said driving tracer stylus around said shaft; means for releasably securing said reproducing tracer stylus in any angular position of adjustment thereof relative to said driving tracer stylus; and means for moving said driving tracer stylus along said master surface.

10. In a powered master unit, in combination, a rotary driving shaft; a master surface spaced from and around said shaft located in a plane generally normal to the axis of said shaft; a driving tracer stylus mounted for movement around said master surface about the axis of said shaft; said driving tracer stylus being connected with said shaft for rotating the shaft by movements of said driving tracer stylus around said master surface; said driving tracer stylus being also mounted for movements freely radially of said shaft toward or from said master surface; a master profile surface around said shaft spaced from and in a plane substantially parallel with the plane of said master surface; a reproducing tracer stylus connected with and movable by rotation of said shaft in tracing engagement with and around said master profile surface; said reproducing tracer stylus being also mounted for movements radially of said shaft toward or from said master profile surface; and powered driving means coupled with said driving tracer stylus for moving the latter around said master surface and rotating said driving shaft to thereby simultaneously move said reproducing tracer stylus in tracing engagement with and around said master profile surface.

11. In a master unit, in combination, a rotary driving shaft; a master surface spaced from and around said shaft located in a plane substantially normal to the axis of said shaft; a driving tracer stylus mounted for movements around said master surface about the axis of said driving shaft; said driving tracer stylus being connected with said driving shaft for rotating said shaft by movements of said driving tracer stylus around said master surface; said driving tracer stylus being mounted for movements freely radially of said shaft toward or from said master surface; a master profile surface around said shaft spaced from and in a plane substantially parallel with the plane of said master surface; a reproducing tracer stylus connected with and movable by rotation of said driving shaft in tracing engagement with and around said master profile surface; said reproducing tracer stylus being mounted for movements radially relative to said shaft toward or from said master profile surface; biasing means continuously acting to yieldingly bias said reproducing tracer stylus radially toward said master profile surface around which said reproducing tracer stylus is moved by said shaft; and powered means for moving said driving tracer stylus around said master surface for powered rotation of said driving shaft and movement of said reproducing tracer stylus thereby around said master profile surface.

12. In a powered master unit, in combination, a base having an endless master groove therein; a driving chain mounted in and movable through and around said master groove; powered means for moving said driving chain through said master groove; a driving tracer stylus in said master groove coupled with said driving chain for movements by said chain through said master groove; a profile master mounting table opposite and spaced from said base; a profile master on said mounting base having a master profile surface thereon; a reproducing tracer stylus mounted for rotation about an axis normal to said table for movements in tracing engagement with and around said profile surface of said profile master on said table; driving connections between said driving tracer stylus and said reproducing tracer stylus for movements of the latter around said profile surface by movements of said driving tracer stylus around said master groove; said reproducing tracer stylus being mounted for adjustment around its axis of rotation in either direction independently of said driving tracer stylus to a selected position of angular adjustment thereof relative to the position of said driving tracer stylus; and means for releasably securing said reproducing tracer stylus in any selected position of adjustment.

13. In a powered master unit, in combination, a base; a rotary driving shaft mounted with its axis normal to the plane of said base; said base having a master groove therein spaced around said driving shaft; a driving tracer stylus holder mounted on said driving shaft in position disposed radially thereof for rotation therewith; said driving tracer stylus holder having a member mounted thereon for reciprocation freely radially of said driving shaft toward or from said master groove; a driving tracer stylus mounted in said master groove for movement therealong; said driving tracer stylus being connected to said reciprocal member of said driving tracer stylus holder and being movable therewith radially relative to said driving shaft and movable along said master groove by rotation of said driving tracer stylus holder with said rotary driving shaft; a reproducing tracer stylus holder mounted on said shaft spaced axially therealong from said driving tracer stylus holder and being positioned disposed radially of said shaft for rotation therewith; said reproducing tracer stylus holder having a member mounted thereon for reciprocation independently thereof and radially relative to said driving shaft; a master profile surface in a plane normal to the axis of said shaft; a reproducing tracer stylus connected with said reciprocal member of said reproducing tracer stylus holder for movements with said reciprocal member radially of said shaft toward or from said master profile surface and for movements with said reproducing tracer stylus holder around said master profile surface by rotation of said driving shaft; and means for moving said driving tracer stylus along said master groove.

14. In a powered master unit, in combination, a base; a profile master mounting table spaced from and generally parallel with said base; a driving shaft rotatably mounted in position extending through said base and said profile master mounting table in position with its axis normal to the planes of said base and said table; an endless master surface on said base spaced from and around said driving shaft in a normally fixed position thereon; a master profile surface spaced from and around said driving shaft and being mounted on said table in any selected position of angular adjustment around said shaft relative to the position of said master surface on said base; a driving tracer stylus mounted for movements around said master surface on said base; a powered driving transmission connected with said driving tracer stylus and including a driving motor and a variable speed transmission connected between said motor and said driving tracer sylus; said driving tracer stylus being connected with said driving shaft for rotating said shaft by movements of said driving tracer stylus around said master surface; a reproducing tracer stylus connected with said driving shaft for movement around said master profile surface on said mounting table by rotation of said driving shaft; said reproducing tracer stylus being adjustable around said master profile surface through a selected angle therearound relative to the position of said driving tracer stylus along and around said master surface on said base; and means for releasably securing said reproducing tracer stylus in any selected position of adjustment thereof around said master profile surface.

15. In combination, a base mounted in normally fixed position and having thereon an endless master surface located in a plane substantially parallel with the plane of said base; said endless master surface being located at a predetermined fixed position on said base; a mounting table spaced from said base in position generally parallel therewith; a master having an endless master profile surface thereon removably mounted on said mounting table with said master profile surface being located in a plane generally parallel with the plane of said mounting table and said base; said master being mounted in position with said master profile surface thereof at a predetermined angle around and relative to said master surface on said base; a driving tracer stylus mounted for movements around said master surface and being also mounted for movements radially toward or from said master surface; a reproducing tracer stylus mounted for movements in tracing engagement with and around said master profile surface of said master and being also mounted for movements radially toward or from said master profile surface; said driving tracer stylus being operatively coupled with said reproducing tracer stylus for moving the latter around said master profile surface by movements of said driving tracer stylus around said master surface; said reproducing tracer stylus being mounted for adjustment to a position around said master profile surface angularly displaced from the position of said driving tracer stylus around said master surface through an angle equal to the angle at which said master profile surface is set around and relative to said master surface; means for releasably securing said reproducing tracer stylus in any position of angular adjustment thereof around said master profile surface; and a powered drive mechanism connected with said driving tracer stylus for moving the latter around said master surface.

16. In the combination of claim 15, said powered drive mechanism including an electric driving motor, controlling circuits for said motor, a cam shaft driven from said powered drive mechanism, a switch operating member mounted on and revolved by said cam shaft, and a cycle controlling switch connected into said control circuits for said driving motor and for actuation by said switch operating member on said cam shaft to stop said driving motor automatically at the conclusion of a cycle of operation of said reproducing tracer stylus around said master profile surface.

17. In the combination of claim 15, a rotary driving shaft connected with said driving tracer stylus for rotation by movements of the latter around said master surface; and operative connections between said driving shaft and said reproducing tracer stylus for moving said reproducing tracer stylus around said master profile surface by rotation of said driving shaft.

18. In the combination of claim 15, said powered mechanism including a driving motor and a variable speed transmission connected between said driving motor and said driving tracer stylus for moving said reproducing tracer stylus around said master profile surface by movements of said driving tracer stylus around said master surface.

19. In the combination of claim 15, said powered drive mechanism including a driving motor, an endless driving chain around said master surface on said base, a driving sprocket in engagement with said driving chain, a transmission between said motor and said driving sprocket, and said driving tracer stylus being directly coupled with said driving chain for moving said reproducing tracer stylus around said master profile surface by movements of said driving tracer stylus around said master surface by said driving chain.

20. In combination, a base mounted in a normally fixed position and having thereon an endless master surface in fixed position located in a plane substantially parallel with the plane of said base; said endless master surface being located in its plane in position angularly displaced from the position on a work piece of a profile to be formed thereon; a mounting table spaced from said base opposite and generally parallel therewith; an endless profile surface on said mounting table located in a plane substantially parallel with the plane of said endless master surface on said base; said endless profile surface being set in its plane on said mounting table in the same angular position relative thereto as the angular position relative to a work piece of the profile to be reproduced thereon from said master profile surface; said master surface on said base having a profile at least approximating the profile of the surface to be formed on a work piece; said master profile surface on said mounting table constituting a precisely scaled reproduction of the profile of the surface to be formed on a work piece; a driving tracer stylus mounted for movements around said master surface; a reproducing tracer stylus mounted for movements in tracing engagement with and around said master profile surface on said mounting table; said reproducing tracer stylus being adjustable independently of and relative to said driving tracer stylus to a position around said master profile surface through an angle equal to the angle at which said master profile surface is set relative to said master surface; means for releasably securing said reproducing tracer stylus in any position of adjustment thereof; powered means coupled with said driving tracer stylus for moving the latter around said master surface; and operative connections between said driving tracer stylus and said reproducing tracer stylus for moving the latter around said master profile surface by and simultaneously with movements of said driving tracing stylus around said master surface.

21. In a powered master unit, in combination, a base having thereon an elliptical-shape master surface; a driving tracer stylus mounted for movements around said master surface; a master mounting table opposite and spaced from said base in position generally parallel therewith; a master removably mounted on said mounting table and having thereon an elliptical-shaped master profile surface located in a plane generally parallel with the plane of said elliptical-shape master surface on said base; said master being positioned on said mounting table to locate said elliptical-shape master profile surface with the long axis thereof at an angle to the long axis of said elliptical-shape master surface on said base; a reproducing tracer stylus mounted for movements in tracing engagement with and around said master profile surface; said reproducing tracer stylus being mounted for adjustment independently of and relative to said driving tracer stylus and being set at a position around said master profile surface from the position of said driving tracer stylus on said master surface through an angle equal to the angle at which said master profile surface is set relative to said master surface; means coupled with said driving tracer stylus for moving the latter around said master surface; and operative connections between said driving tracer stylus and said reproducing tracer stylus for moving the latter around said master profile surface simultaneously with and by movements of said driving tracer stylus around said master surface.

References Cited in the file of this patent

UNITED STATES PATENTS

| | | |
|---|---|---|
| 2,557,876 | Klema | June 19, 1951 |
| 2,645,161 | Stuart et al. | July 14, 1953 |
| 2,674,160 | Martellotti | Apr. 6, 1954 |